United States Patent
Huang et al.

(10) Patent No.: US 11,363,486 B2
(45) Date of Patent: Jun. 14, 2022

(54) INFORMATION PROCESSING METHOD AND DEVICE FOR IMPROVING SYSTEM CAPACITY

(71) Applicant: HUAWEI TECHNOLOGIES CO., LTD., Shenzhen (CN)

(72) Inventors: Zhong Huang, Chengdu (CN); Peng Lu, Chengdu (CN); Qiang Zhou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 16/833,171

(22) Filed: Mar. 27, 2020

(65) Prior Publication Data

US 2020/0267590 A1  Aug. 20, 2020

Related U.S. Application Data

(63) Continuation of application No. PCT/CN2018/107618, filed on Sep. 26, 2018.

(30) Foreign Application Priority Data

Sep. 29, 2017 (CN) .......................... 201710908317.9

(51) Int. Cl.
  *H04W 28/02* (2009.01)
  *H04W 28/22* (2009.01)

(52) U.S. Cl.
  CPC .................. *H04W 28/0257* (2013.01); *H04W 28/0263* (2013.01); *H04W 28/22* (2013.01)

(58) Field of Classification Search
  CPC ......... H04W 28/0257; H04W 28/0263; H04W 28/22
  See application file for complete search history.

(56) References Cited

U.S. PATENT DOCUMENTS

2006/0293074 A1* 12/2006 Bottomley .......... H04W 52/322
                                                                   455/522
2013/0176973 A1*  7/2013 Gormley ................. H04L 1/205
                                                                   370/329

(Continued)

FOREIGN PATENT DOCUMENTS

CN      102421108 A     4/2012
CN      102972082 A     3/2013

(Continued)

OTHER PUBLICATIONS

ITU-R Ad Hoc, "Draft update of Section 5.1", RT-040017, total 37 pages.

(Continued)

*Primary Examiner* — Chi H Pham
*Assistant Examiner* — Weibin Huang
(74) *Attorney, Agent, or Firm* — Hauptman Ham, LLP

(57) ABSTRACT

Embodiments of this application provide an information processing method. The method includes: obtaining first dedicated channel DCH user quantities, first power, and first adaptive multi-rate AMR traffic volumes that respectively correspond to a plurality of phase groups; obtaining a target value corresponding to each of the plurality of phase groups through calculation based on the first DCH user quantities, the first power, and the first AMR traffic volumes that respectively correspond to the plurality of phase groups, where the target value is used to represent a system capacity; determining, based on the target value, the first phase group in the plurality of phase groups; and sending the first phase group to an access network device, where the first phase group is used by the access network device to adjust a phase of a transmission channel by using the first phase group in a current period.

16 Claims, 6 Drawing Sheets

(56) References Cited

U.S. PATENT DOCUMENTS

| | | | | |
|---|---|---|---|---|
| 2015/0055625 A1* | 2/2015 | Burbidge | ............... | H04W 68/02 |
| | | | | 370/331 |
| 2016/0037418 A1* | 2/2016 | Burbidge | ........... | H04W 36/0061 |
| | | | | 370/331 |
| 2016/0330643 A1* | 11/2016 | Sahin | ..................... | H04W 24/10 |
| 2017/0250746 A1* | 8/2017 | Wang | ................... | H04W 64/003 |
| 2017/0251406 A1 | 8/2017 | Burbidge et al. | | |
| 2020/0021346 A1 | 1/2020 | Xie et al. | | |
| 2020/0045587 A1* | 2/2020 | Choi | ..................... | H04W 28/20 |

FOREIGN PATENT DOCUMENTS

| | | | |
|---|---|---|---|
| CN | 103036650 A | | 4/2013 |
| CN | 103138816 A | | 6/2013 |
| CN | 103718475 A | | 4/2014 |
| CN | 106688195 A | | 5/2017 |
| CN | 107196684 A | | 9/2017 |

OTHER PUBLICATIONS

Notification to Grant Patent Right for Invention issued in corresponding Chinese Application No. 201710908317.9, dated Sep. 30, 2020, pp. 1-5, State Intellectual Property Office of People's Republic of China, Beijing, China.

International search report dated Dec. 24, 2018 from corresponding application No. PCT/CN2018/107618.

Office Action dated Apr. 28, 2020 from corresponding application No. CN 201710908317.9.

Extended European Search Report issued in corresponding European Application No. 18862065.2, dated Oct. 12, 2020, pp. 1-8, Munich, Germany.

* cited by examiner

INFORMATION PROCESSING METHOD AND DEVICE FOR IMPROVING SYSTEM CAPACITY

CROSS-REFERENCE TO RELATED APPLICATIONS

This application is a continuation of International Application No. PCT/CN2018/107618, filed on Sep. 26, 2018, which claims priority to Chinese Patent Application No. 201710908317.9, filed on Sep. 29, 2017. The disclosures of the aforementioned applications are hereby incorporated by reference in their entireties.

TECHNICAL FIELD

This application relates to the field of communications technologies, and in particular, to an information processing method and a related device.

BACKGROUND

In a scenario in which an uplink frequency spectrum is redeployed and a long term evolution (LTE) deploys 4T4R (4T4R), a quantity of carriers of a universal mobile telecommunications system (UMTS) is reduced. Because a terminal penetration rate of the LTE cannot be improved significantly in a short time, a user is still camped in a UMTS carrier. In this case, the UMTS faces serious downlink capacity demands, and existing UMTS 2T2R cannot obtain a capacity gain.

By performing beamforming on different carriers of a same sector to form a staggered complementary coverage, a terminal (UE) can obtain a capacity gain by inter-frequency re-selection and inter-frequency switching to an optimal carrier. In the prior art, the beamforming is generally performed in the following manner: obtaining an optimal phase difference of each user by traversing a phase difference between two different polarization antennas, and automatically scheduling the optimal phase difference of a user terminal based on a signal condition of the user terminal and historical data and history scheduling information that are buffered in a base station corresponding to the user terminal, thereby achieving an objective of enhancing receiving quality of the user terminal and finally improving user experience. In this manner, the beamforming is actually not implemented. This manner can only improve signal receiving quality of a specific user terminal and cannot reach the objective of increasing a system capacity.

SUMMARY

Embodiments of this application provide an information processing method and a related device, capable of implementing beamforming, thereby improving a system capacity.

According to a first aspect, an embodiment of this application provides an information processing method applied to an information processing device. The method includes: obtaining first dedicated channel DCH user quantities, first power, and first adaptive multi-rate AMR traffic volumes that respectively correspond to a plurality of phase groups, where the phase group includes a first phase value and a second phase value, the first phase value and the second phase value are used to adjust phases of different transmission channels, a first DCH user quantity corresponding to a target phase group is a user quantity obtained based on first data that is in a first period, the target phase group is any one of the plurality of phase groups, the first period is a period next to a period in which the target phase group is determined as a first phase group, the first data in the first period is a sum of DCH user quantities that are collected in the first period and are of cells in a first common coverage area, the first power is power obtained based on a difference between second data and third data that are in the first period, the second data in the first period is a sum of non-high-speed downlink packet access power that is collected in the first period and is of the cells in the first common coverage area, the third data in the first period is a sum of common channel power that is collected in the first period and is of the cells in the first common coverage area, the first AMR traffic volume is a traffic volume obtained based on fourth data that is in the first period, and the fourth data in the first period is a sum of AMR traffic volumes that are collected in the first period and are of the cells in the first common coverage area; obtaining a target value corresponding to each of the plurality of phase groups through calculation based on the first DCH user quantities, the first power, and the first AMR traffic volumes that respectively correspond to the plurality of phase groups, where the target value is used to represent a system capacity, determining, based on the target value, the first phase group in the plurality of phase groups; and sending the first phase group to an access network device, where the first phase group is used by the access network device to adjust a phase of a transmission channel by using the first phase group in a current period.

It can be learned that, according to the method described in the first aspect, the information processing device can select, based on the target value used to represent a size of the system capacity, the first phase group to adjust the phase of the transmission channel of the cell. After adjusting the phase by using the phase group with the greatest target value, the system capacity is largest. A probability that the phase group with the greatest target value is the first phase group is largest. Therefore, adjusting the phase by using the first phase group is beneficial to implementing beamforming and improving the system capacity.

Optionally, a specific implementation of obtaining the target value corresponding to each of the plurality of phase groups through calculation based on the first DCH user quantities, the first power, and the first AMR traffic volumes that respectively correspond to the plurality of phase groups may be: for any phase group in the plurality of phase groups, obtaining R_Capacity(k) corresponding to the phase group based on a first DCH user quantity and first power that correspond to the phase group, where $$R\_Capacity(k) = \frac{Capacity(k)}{Capacity(Baseline)},$$

k corresponds to a $k^{th}$ phase group in the plurality of phase groups, Capacity(k) is a capacity value corresponding to the $k^{th}$ phase group, Capacity(k) is equal to a first DCH user quantity corresponding to the $k^{th}$ phase group divided by first power corresponding to the $k^{th}$ phase group, and Capacity(Baseline) is an average value of capacity values corresponding to all of the plurality of phase groups; obtaining R_AMR(k) based on a first AMR traffic volume corresponding to the phase group, where if a difference between AMR(k) and AMR(Baseline) is less than −AMRScov, R_AMR(k) is 0, and if the difference between AMR(k) and AMR(Baseline) is greater than or equal to −AMRScov, R_AMR(k) is 1; AMR(k) is a first AMR traffic volume corresponding to the $k^{th}$ phase group, and AMR(Baseline) is an average value of the first AMR traffic volumes corresponding to all of the plurality of phase groups; and AMR-Scov is an AMR tolerance threshold of a common coverage area level; and using a product of R_Capacity(k) and R_AMR(k) as the target value.

It can be seen that, according to this implementation, the target value used to represent the system capacity can be accurately obtained through calculation.

Optionally, after obtaining R_AMR(k) based on the first AMR traffic volume corresponding to the phase group, the following part may further be performed: calculating AMR_Total_Baseline, where AMR_Total_Baseline is a sum of AMR(Baseline) of all common coverage areas covered by the information processing device corresponding to the first common coverage area; and if AMR_Total_Baseline is not equal to 0 and satisfies $$\frac{AMR\_Total\_Mean}{AMR\_Total\_Baseline} \langle 1 - AMR\_Total\_Thld,$$

updating R_AMR(k) that corresponds to some common coverage areas covered by the information processing device corresponding to the first common coverage area and corresponds to a first phase group determined in a second period to zero, where the second period is two subtracted from the current period, AMR_Total_Mean is an average value of AMR traffic volumes corresponding to all common coverage areas in a total area covered by the information processing device, and AMR_Total_Thld is an AMR tolerance threshold of a total area level of the information processing device corresponding to the first common coverage area.

It can be seen that, implementing this implementation is beneficial to accurately obtaining, through calculation, the target value used to represent the system capacity.

Optionally, a specific implementation of determining, based on the target value, the first phase group in the plurality of phase groups may be: obtaining, based on a currently used phase group, a preset quantity of second phase groups in the plurality of phase groups, where a difference between a first phase value in the second phase group and a first phase value in the first phase group determined in a previous period is not greater than a preset degree, and a difference between a second phase value in the second phase group and a second phase value in the first phase group determined in the previous period is not greater than the preset degree; obtaining, in the preset quantity of second phase groups, a second phase group with a greatest target value; calculating a first selection probability of the second phase group with the greatest target value, where A=1−ε, A is the first selection probability, $$\varepsilon = \max\left\{\min\left(\frac{1}{\sqrt{(0.1*t)}}, \frac{N-1}{N}\right), 0.1\right\},$$

t is a valid iteration period number, the valid iteration period number is a number of a period in which the phases of the transmission channels are adjusted by using a phase group, and N is equal to the preset quantity; calculating a second selection probability of a phase group in the preset quantity of second phase groups except the second phase group with the greatest target value, where $$B = \frac{\varepsilon}{N-1},$$

and B is the second selection probability; and randomly selecting, based on the first selection probability and the second selection probability, a phase group in the preset quantity of second phase groups as the first phase group.

According to this implementation, the phase group with the greatest target value can be selected at a largest probability as the first phase group, so that beamforming can be implemented by modulating a phase based on the first phase group.

Optionally, before obtaining the first DCH user quantities, the first power, and the first AMR traffic volumes that respectively correspond to the plurality of phase groups, the following part may be performed: collecting first data, a difference between second data and third data, and fourth data that are in the current period; filtering the first data that is in the current period, and obtaining and storing a first DCH user quantity corresponding to the first phase group determined in the previous period, where $$\text{filter\_Q1} = \left(1 - \frac{1}{n}\right)*\text{filter\_Q1} + \frac{1}{n}*Q1,$$

filter_Q1 is the first DCH user quantity corresponding to the first phase group determined in the previous period. Q1 is the first data collected in the current period, and n is a dynamic filtering coefficient of the first phase group determined in the previous period; filtering the difference between the second data and the third data that are in the current period, and obtaining and storing first power corresponding to the first phase group determined in the previous period, where $$\text{filter\_Q2} = \left(1 - \frac{1}{n}\right)*\text{filter\_Q2} + \frac{1}{n}*Q2,$$

filter_Q2 is the first power corresponding to the first phase group determined in the previous period, Q2 is the difference between the second data and the third data collected in the current period, and n is the dynamic filtering coefficient of the first phase group determined in the previous period; and filtering the fourth data that is in the current period, and obtaining and storing a first AMR traffic volume corresponding to the first phase group determined in the previous period, where $$\text{filter\_Q3} = \left(1 - \frac{1}{n}\right)*\text{filter\_Q3} + \frac{1}{n}*Q3,$$

filter_Q3 is the first AMR traffic volume corresponding to the first phase group determined in the previous period, Q3 is the fourth data collected in the current period, and n is the dynamic filtering coefficient of the first phase group determined in the previous period.

According to this implementation, the first data, the difference between the second data and the third data, and the fourth data corresponding to the phase group can be filtered (abnormal data can be filtered out) to obtain the first DCH user quantity, the first power, and the first AMR traffic volume. Based on the first DCH user quantity, the first power, and the first AMR traffic volume, a target value corresponding to each phase group and used to represent a capacity can be obtained through calculation more accurately.

Optionally, a specific implementation of filtering the first data that is in the current period may be: if the first data in the current period is greater than zero, filtering the first data that is in the current period; a specific implementation of filtering the difference between the second data and the third data that are in the current period may be: if the difference between the second data and the third data in the current period is greater than zero, filtering the difference between the second data and the third data that are in the current period; and a specific implementation of filtering the fourth data that is in the current period may be: if the fourth data in the current period is greater than zero, filtering the fourth data that is in the current period.

Abnormality determining is first performed on the first data, the difference between the second data and the third data, and the fourth data, and filtering is then performed, to ensure that the target value used to represent the system capacity can be accurately obtained through calculation based on the obtained first DCH user quantity, first power, and first AMR traffic volume.

Optionally, a specific implementation of filtering the first data that is in the current period may be: if $|M1-Mean1| \leq (4*SrdevScov1)$ is satisfied, filtering the first data that is in the current period, where M1 is the first data in the current period, Mean1 is an average value of a sum of DCH user quantities that are collected at a preset quantity of traffic statistics time points and are of all the cells in the first common coverage area, and StdevScov1 is a standard deviation of the sum of the DCH user quantities of all the cells in the first common coverage area; a specific implementation of filtering the difference between the second data and the third data that are in the current period may be: if $|M2-Mean2| \leq (4*StdevScov2)$ is satisfied, filtering the difference between the second data and the third data that are in the current period, where M2 is the difference between the second data and the third data in the current period, Mean1 is an average value of differences that are collected at the preset quantity of traffic statistics time points and are between first non-high-speed downlink packet access power and first common channel power of all the cells in the first common coverage area, and StdevScov2 is a standard deviation of the differences between the first non-high-speed downlink packet access power and the first common channel power of all the cells in the first common coverage area; and a specific implementation of filtering the fourth data that is in the current period may be: if $|M3-Mean3| \leq (4*StdevScov3)$ is satisfied, filtering the fourth data that is in the current period, where M is the fourth data in the current period, Mean3 is an average value of a sum of AMR traffic volumes that are collected at the preset quantity of traffic statistics time points and are of all the cells in the first common coverage area, and StdevScov3 is a standard deviation of the sum of the AMR traffic volumes of all the cells in the first common coverage area.

Abnormality determining is first performed on the first data the difference between the second data and the third data, and the fourth data, and filtering is then performed, to ensure that the target value used to represent the system capacity can be accurately obtained through calculation based on the obtained first DCH user quantity, first power, and first AMR traffic volume.

Optionally, a specific implementation of collecting, by the information processing device, the first data, the difference between the second data and the third data, and the fourth data may include the following parts (1) to (3):

(1) Collect cell information and update the cell information in a cell information table, where the cell information table includes information about cells in all clusters in the first common coverage area. The collected cell information may include a cell identifier, a base station identifier, a frequency band identifier, a frequency identifier, a sector identifier, an AMR traffic volume, a DCH user quantity, non-high-speed downlink packet access power, and common channel power. The collected cell information includes information about central cells of all clusters in the first common coverage area, and information about all neighboring cells that have a TOP switching relationship with the central cells. The collected cell information includes information about central cells of all clusters in the first common coverage area, and information about some neighboring cells that have a TOP switching relationship with the central cells.

The neighboring cell of which the cell information is collected may be selected in the following manners:

A. For a current central cell: Use data of a day before beamforming enabling, take a statistics result by using VS.IntraFreq.Periodic.MrRpt.Ncell, and select neighboring cells for which quantities of link switching times are in top Min {5, top 80% in rank}, for cell information collection.

B. Every early morning, refresh TOP neighboring cell information of the cluster: when a neighboring cell that has a TOP switching relationship changes, processing is necessary for each change. A newly-added/newly-changed cell can be added to the TOP neighboring cell information of the cluster only when a quantity of link switching times for the cell is greater than 20% of a total quantity of link switching times for all neighboring cells. Otherwise, the information is not updated. Steps in an updating algorithm are as follows:

An intersection set is taken. First, take an intersection set of new and old TOP neighboring cell information, and reserve a public part. When a neighboring cell is newly added to the new TOP neighboring cell information compared with the old TOP neighboring cell information, if a quantity of switching times for any newly-added cell accounts for more than 20%, the old TOP neighboring cell information is replaced with the new TOP neighboring cell information. When a neighboring cell is deleted from the new TOP neighboring cell information compared with the old TOP neighboring cell information, if MML configuration of the deleted neighboring cell is deleted, the old TOP neighboring cell information is replaced with the new TOP neighboring cell information.

It is worth mentioning that, the non-high-speed downlink packet access power and the common channel power can be expressed as power percentages. For example, a NonH power percentage may be: $10^{\wedge}(VS.MeanTCP.NonHS/10)/10^{\wedge}(MAXTXPOWER/100)$. A PCPICH power percentage may be: $PCPICH\_Factor*10^{\wedge}(PCPICHPower/100)/10^{\wedge}(MAXTXPOWER-100)$. An SCH power percentage may be: $(PSCH\_Factor*10^{\wedge}((PCPICHPower+PSCHPower)/100)+SSCH\_Factor*10^{\wedge}((PCPIC\ HPower+SSCHPower)/100))/10^{\wedge}(MAXTXPOWER/100)$. A BCH_PCCPCH power percentage may be: $BCH\_Factor*10^{\wedge}((PCPICHPower+BCHPower)/100)/10^{\wedge}(MAXTXPOWER/100)$. A PICH power percentage may be: $PICH\_Factor*10^{\wedge}((PCPICHPower+PICHPowerOffset*10)/100)/10^{\wedge}(MAXTXPOWE$ R/100). MAXTXPOWER is total power of a cell. In the cell information table, the common channel power may be a sum of the PCPICH power percentage, the SCH power percentage, the BCH_PCCPCH power percentage, and the PICH power percentage.

(2) Update a cluster information table based on the cell information in the cell information table. The cluster information table includes an identifier of a cluster, and an identifier of a central cell in the cluster is usually used to represent the identifier of the cluster. The cluster information table includes a DCH user quantity, a difference between non-high-speed downlink packet access power and common channel power, and an AMR traffic volume.

A DCH user quantity of a cluster 1 in the cluster information table is a sum of DCH user quantities of all cells in the cluster 1 in the cell information table. The cluster 1 is any cluster in the cluster information table.

A difference between non-high-speed downlink packet access power and common channel power of the cluster 1 in the cluster information table is equal to a sum of non-high-speed downlink packet access power of all cells in the cluster 1 in the cell information table subtracted by a sum of common channel power of all the cells in the cluster 1.

An AMR traffic volume of the cluster 1 in the cluster information table is a sum of AMR traffic volumes of all cells in the cluster 1 in the cell information table.

(3) Update a common coverage area information table based on the information in the cluster information table. The common coverage area information table includes an identifier of a common coverage area. For example, the identifier of the common coverage area may be an identifier of the information processing device+a base station identifier+a sector identifier+a frequency band identifier. The common coverage area information table further includes a DCH user quantity, a difference between non-high-speed downlink packet access power and common channel power, and an AMR traffic volume.

A DCH user quantity of a first common coverage area in the common coverage area information table is first data corresponding to the first phase group determined in the previous period. A difference between non-high-speed downlink packet access power and common channel power of the first common coverage area in the common coverage area information table is a difference between second data and third data corresponding to the first phase group determined in the previous period. An AMR traffic volume of the first common coverage area in the common coverage area information table is fourth data corresponding to the first phase group determined in the previous period.

Optionally, the first phase group is used by the access network device to adjust a phase of a transmission channel of a first cell in the first common coverage area by using the first phase group in a current period, and the following part may be performed: obtaining a third phase group used to adjust a phase of a transmission channel of a second cell in the first common coverage area, where the third phase group is obtained based on the first phase group, the first cell and the second cell are different, the first phase group and the second phase group are different, if there are a plurality of second cells, third phase groups respectively corresponding to the second cells are different, and the first cell and the second cell are central cells of clusters in the first common coverage area; and sending the third phase group to the access network device.

According to this implementation, multi-carrier heterogeneity can be implemented. That is, beamforming is performed on different carriers of a same sector to form a staggered complementary coverage, and UE can obtain a capacity gain by inter-frequency re-selection and inter-frequency switching to an optimal carrier.

According to a second aspect, an embodiment of this application provides an information processing method applied to an access network device. The method includes: receiving a first phase group sent by an information processing device, where the first phase group includes a first phase value and a second phase value; adjusting a phase of a first transmission channel based on the first phase value; and adjusting a phase of a second transmission channel based on the second phase value, where the first transmission channel and the second transmission channel belong to different polarization groups.

It can be learned that, according to the method described in the second aspect, the access network device can adjust the phase of the transmission channel of the cell by using the first phase group, thereby implementing beamforming.

Optionally, a specific implementation of adjusting the phase of the first transmission channel based on the first phase value may be: adjusting, at a preset adjustment speed, the phase of the first transmission channel based on the first phase value; and a specific implementation of adjusting the phase of the second transmission channel based on the second phase value may be: adjusting, at the preset adjustment speed, the phase of the first transmission channel based on the second phase value.

Immediate changes of the first phase value and the second phase value in the phase may affect user experience. According to this implementation, adjusting the phase value slowly is beneficial to improving user experience.

Optionally, a difference between the first phase value in the first phase group and a first phase value in a first phase group determined in a previous period is not greater than a preset degree, and a difference between the second phase value in the first phase group and a second phase value in the first phase group determined in the previous period is not greater than the preset degree.

An excessive change in the phase may affect user experience. Implementing this implementation is beneficial to improving user experience.

Optionally, the first phase group is used by the access network device to adjust a phase of a transmission channel of a first cell in the first common coverage area by using the first phase group in a current period, and the following part may be performed: receiving a third phase group sent by the information processing device and used to adjust a phase of a transmission channel of a second cell in the first common coverage area, where the third phase group is obtained based on the first phase group, the first cell and the second cell are different, the first phase group and the second phase group are different if there are a plurality of second cells, third phase groups respectively corresponding to the second cells are different, and the first cell and the second cell are central cells of clusters in the first common coverage area, adjusting a phase of a first transmission channel of the second cell based on a first phase value in the third phase group; and adjusting a phase of a second transmission channel of the second cell based on a second phase value in the third phase group, where the first transmission channel of the second cell and the second transmission channel of the second cell belong to different polarization groups.

According to this implementation, multi-carrier heterogeneity can be implemented. That is, beamforming is performed on different carriers of a same sector to form a staggered complementary coverage, and UE can obtain a capacity gain by inter-frequency re-selection and inter-frequency switching to an optimal carrier.

Optionally, if the access network device does not receive the first phase group within a preset time period, the access network device obtains a default phase group; adjusts the phase of the first transmission channel based on a first phase value in the default phase group; and adjusts the phase of the second transmission channel based on a second phase value in the default phase group.

According to a third aspect, an information processing device is provided. The information processing device can perform the method in the first aspect or the possible implementations of the first aspect. The function may be implemented by using hardware, or may be implemented by hardware executing corresponding software. The hardware or software includes one or more units corresponding to the foregoing function. The unit may be software and/or hardware. Based on a same inventive concept, for principles of resolving the problem by the information processing device and beneficial effects of the information processing device, refer to the first aspect or the possible implementations of the first aspect, and beneficial effects thereof. Repeated descriptions are not described again.

According to a fourth aspect, an access network device is provided. The access network device can perform the method in the second aspect or the possible implementations of the second aspect. The function may be implemented by using hardware, or may be implemented by hardware executing corresponding software. The hardware or software includes one or more units corresponding to the foregoing function. The unit may be software and/or hardware. Based on a same inventive concept, for principles of resolving the problem by the access network device and beneficial effects of the access network device, refer to the second aspect or the possible implementations of the second aspect, and beneficial effects thereof. Repeated descriptions are not described again.

According to a fifth aspect, an information processing device is provided. The information processing device includes: a processor, a memory, a communications interface, and one or more programs. The processor, the memory, and the communications interface are connected to each other. The one or more programs are stored in the memory; and the processor invokes the program stored in the memory to implement the solutions according to the first aspect or the possible communications of the first aspect. For implementations of resolving the problem by the information processing device and beneficial effects of the information processing device, refer to the first aspect or the possible implementations of the first aspect, and beneficial effects thereof. Repeated descriptions are not described again.

According to a sixth aspect, an access network device is provided. The access network device includes: a processor, a memory, a communications interface, and one or more programs. The processor, the memory, and the communications interface are connected to each other. The one or more programs are stored in the memory; and the processor invokes the program stored in the memory to implement the solutions according to the second aspect or the possible communications of the second aspect. For implementations of resolving the problem by the access network device and beneficial effects of the access network device, refer to the second aspect or the possible implementations of the second aspect, and beneficial effects thereof. Repeated descriptions are not described again.

According to a seventh aspect, a computer program product is provided. When the computer program product is run on a computer, the computer is enabled to perform the method according to any one of the first aspect and the second aspect, or any possible optional implementation of the first aspect or the second aspect.

According to an eighth aspect, a chip product of an information processing device is provided, to perform the method according to the first aspect or any possible implementation of the first aspect.

According to a ninth aspect, a chip product of an access network device is provided, to perform the method according to the second aspect or any possible implementation of the second aspect.

DESCRIPTION OF EMBODIMENTS

The following further describes specific embodiments of this application in detail with reference to accompanying drawings.

The embodiments of this application provide an information processing method and a related device, capable of implementing beamforming, thereby improving a system capacity.

To understand the embodiments of this application better, a communications system to which the embodiments of this application can be applied is described below.

Figure 1:
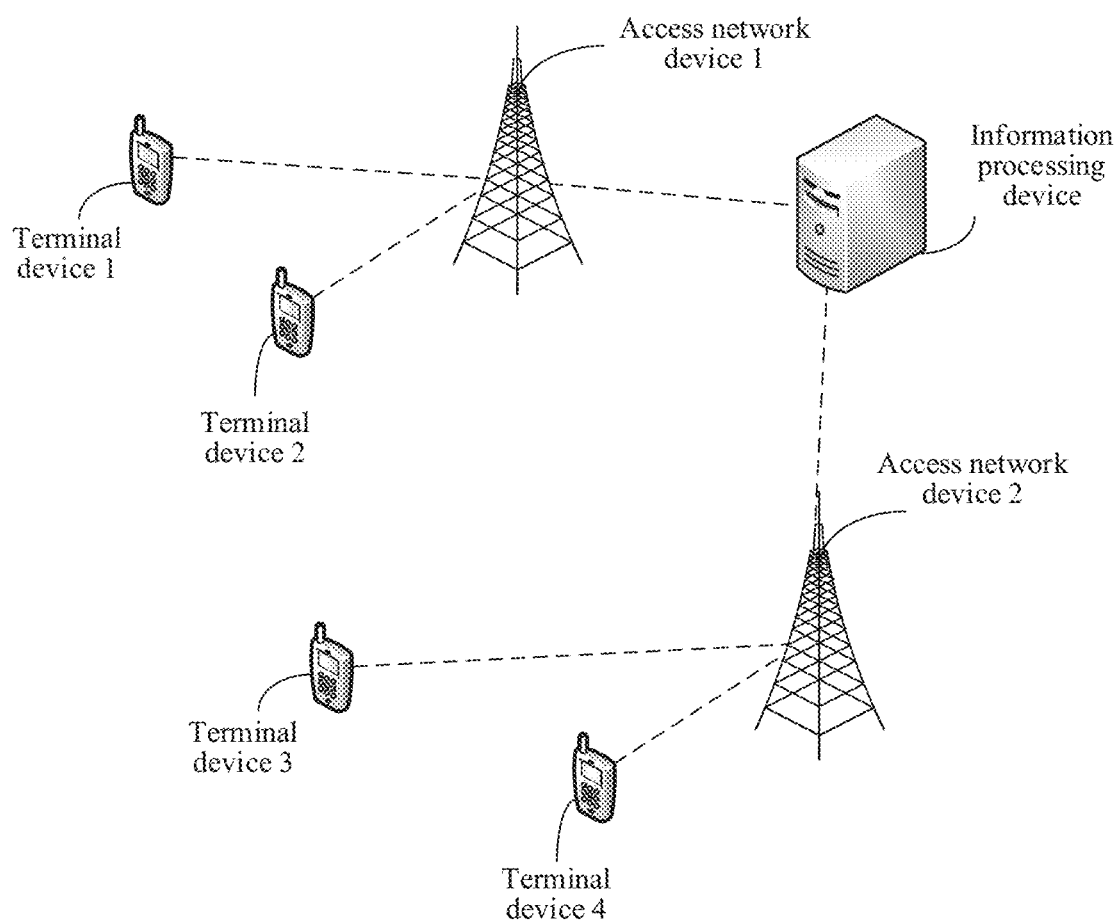
FIG. 1 is a schematic structural diagram of a communications system according to an embodiment of this application.

FIG. 1 is a schematic diagram of a communications system according to an embodiment of this application. As shown in FIG. 1, the communications system includes an information processing device, at least one access network device, and at least one terminal device. In FIG. 1, an example in which one information processing device, two access network devices, and four terminal devices are included is used. Quantities of the information processing devices, the access network devices, and the terminal devices included in the communications system are not limited in the embodiments of this application. The terminal device is connected to the access network device in a wireless manner, and the access network device is connected to the information processing device in a wireless manner.

The information processing device may be a radio network controller (RNC) or may be a base station controller (BSC). The radio network controller is mainly configured to manage and control a plurality of base stations covered by the radio network controller. Functions of the radio network controller may include two parts: a radio resource management function and a control function. The radio resource management is mainly used to maintain stability of radio propagation and service quality of a wireless connection. The control function includes all functions related to radio bearer setup, maintenance, and release.

The access network device is an access device used by the terminal device to access the mobile communications system in a wireless manner, and may be a network side NodeB, an evolved network side eNodeB, a network side in the 5G mobile communications system, a network side in a future mobile communications system, an access node in a Wi-Fi system, or the like. A specific used technology and a specific device form of the access network device are not limited in the embodiments of this application.

The terminal device may also be referred to as a terminal Terminal, user equipment (UE), a mobile station (MS), a mobile terminal (MT), and the like. The terminal device may be a mobile phone, a tablet computer (Pad), a computer having a wireless transmission and receiving function, a virtual reality (VR) terminal device, an augmented reality (AR) terminal device, a wireless terminal related to industrial control, a wireless terminal related to self driving, a wireless terminal related to remote medical surgery (remote medical surgery), a wireless terminal related to a smart grid, a wireless terminal related to transportation safety, a wireless terminal related to a smart city, a wireless terminal related to a smart home, or the like.

The access network device and the terminal device may be deployed on land, including an indoor or outdoor device, a hand-held device, or an in-vehicle device; or may be deployed on water; or may be deployed on an air plane, a balloon, or an artificial satellite in the sky. An application scenario of the radio access network device and the terminal device is not limited in the embodiments of this application.

Some professional terminologies in this application are described below.

Figure 2:
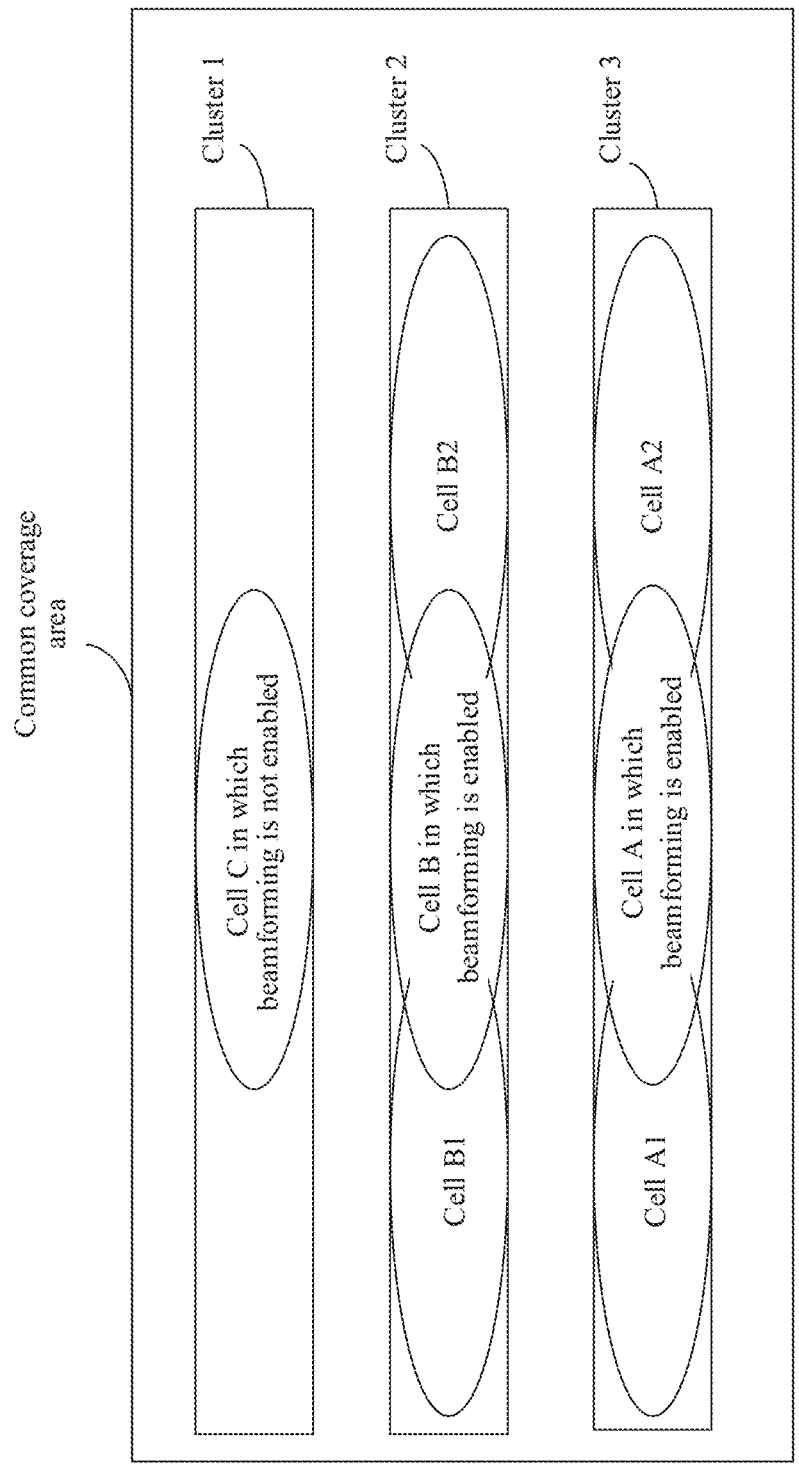
FIG. 2 is a schematic diagram of a common coverage area according to an embodiment of this application.

Cluster: a. If a current cell is a cell enabling beamforming, a cluster of the cell includes this cell and a neighboring cell that has a TOP switching relationship with this cell and the current cell is a central cell of the cluster; and b. if the current cell is a cell in which beamforming is enabled, the cluster of the cell only includes this cell, and the current cell is a central cell of the cluster. As shown in FIG. 2, a cell C in which beamforming is not enabled, and therefore, a cluster 1 only includes the cell C. A cell B in which beamforming is enabled, and a cell B1 and a cell B2 are neighboring cells that have a TOP switching relationship with the cell B. Therefore, a cluster 2 includes the cell B, the cell B1, and the cell B2. Similarly, a cell A in which beamforming is enabled, and a cell A1 and a cell A2 are neighboring cells that have a TOP switching relationship with the cell A. Therefore, a cluster 3 includes the cell A, the cell A1, and the cell A2.

Common coverage area: A plurality of clusters of which central cells satisfy following conditions are identified as one common coverage area: a. the central cells belong to a same NodeB; b. sector IDs of the central cells are consistent; and c. the central cells belong to a same frequency band but different frequencies.

For example, as shown in FIG. 2, the cell A, the cell B, and the cell C belong to a same information processing device, a same sector, a same base station, a same frequency band, and different frequencies, and therefore, the cluster 1, the cluster 2, and the cluster 3 form a common coverage area. An identifier of the common coverage area is an identifier of the information processing device+a sector identifier+a base station identifier+a frequency band identifier.

Figure 3:
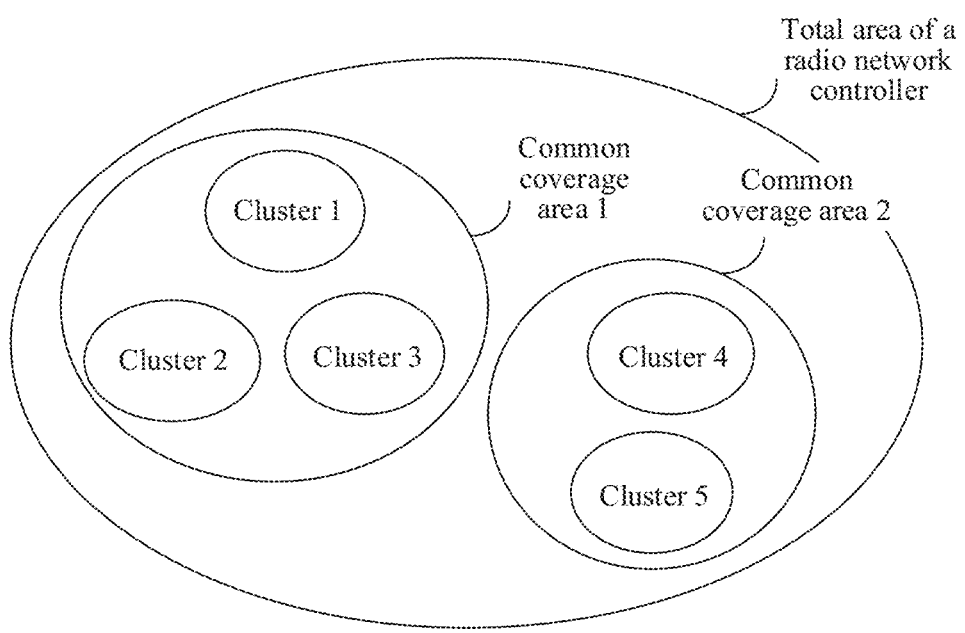
FIG. 3 is a schematic diagram of a total area covered by an information processing device according to an embodiment of this application.

Total area covered by an information processing device (Total area covered by an information processing device): A set of all clusters covered by the information processing device. For example, as shown in FIG. 3, an example in which the information processing device is an RNC is used in FIG. 3, and the RNC includes a cluster 1, a cluster 2, a cluster 3, a cluster 4, and a cluster 5. The cluster 1, the cluster 2, and the cluster 3 belong to a common coverage area 1, and the cluster 4 and the cluster 5 belong to a common coverage area 2.

First dedicated channel (DCH) user quantity: A quantity of users who are using a service including a speech service, a video service, and the like.

Adaptive multi-rate (AMR) traffic volume: An Erlang number of an AMR speech service in a cell.

Common channel power: Including primary common pilot channel (PCPICH) power, physical shared channel (PSCH) power, secondary synchronization channel (SSCH) power, broadcast channel (BCH) power, and paging channel power offset (PICH) power.

Phase group: Including two phase values, namely a first phase value and a second phase value. The first phase value and the second phase value are respectively used to adjust phases of different transmission channels. For example, the first phase value is used to perform phase adjustment on a first transmission channel, and the second phase value is used to adjust a phase of a second transmission channel.

Main ideas of the embodiments of this application are described below.

Figure 4:
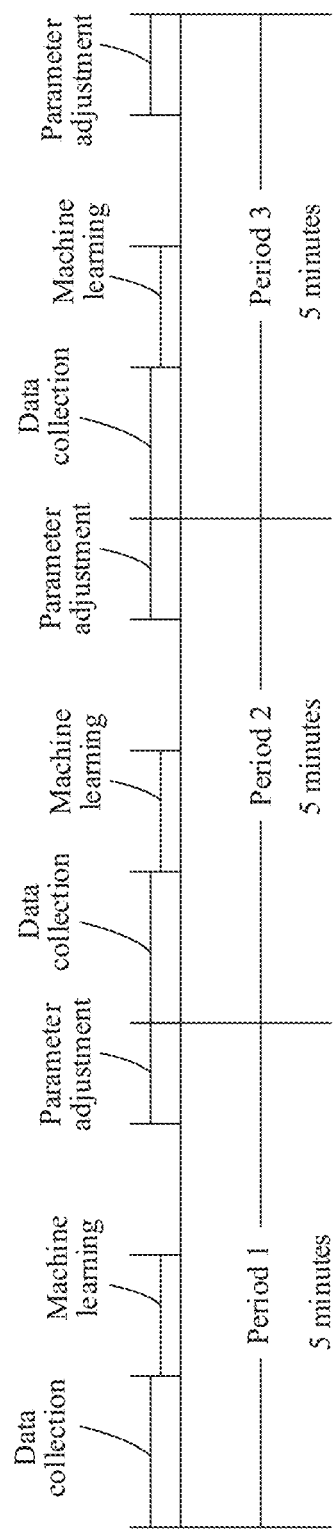
FIG. 4 is a schematic diagram of a periodic procedure according to an embodiment of this application.

As shown in FIG. 4, in this application, a preset time is used as a period. In FIG. 4, an example in which one period is 5 minutes is used, and one period may alternatively be 4 minutes, 10 minutes, or the like. A time length of a period is not limited in the embodiments of the present invention. In a period, data collection is first performed, then machine learning is performed, and then parameter adjustment is performed. Collected data is DCH user quantities, non-high-speed downlink packet access power, and common channel power that are of cells in all common coverage areas covered by the information processing device. The machine learning means calculating, based on collected data of a first common coverage area and data of the first common coverage area collected in a previous period, a target value corresponding to each of a preset plurality of phase groups, where the target value is used to represent a capacity; and determining, based on the target value, a first phase group in the preset plurality of phase groups. The parameter adjustment means adjusting a phase of a transmission channel of a cell in the first common coverage area based on the determined first phase group. The first common coverage area is any common coverage area covered by the information processing device. For example, in a machine learning stage of a period 1, the first phase group is, through calculation, a phase group 1, and in a parameter adjustment stage of the period 1, the phase of the transmission channel of the cell in the first common coverage area is adjusted based on the phase group 1. Data of the first common coverage area collected in a period 2 is data corresponding to the phase group 1, and in the period 2, the first phase group used for phase adjustment can be obtained through calculation based on the data corresponding to the phase group 1 and data of the first common coverage area that is historically collected and corresponds to another phase group. For example, the first phase group is a phase group 2. In a parameter adjustment stage of the period 2, the phase of the transmission channel in the first common coverage area is adjusted based on the phase group 2. In a period 3, data corresponding to the phase group 2 is collected, and the phase group used for phase adjustment is obtained through calculation based on the data corresponding to the phase group 2 and data of the first common coverage area that is historically collected and corresponds to another phase group, and in a parameter adjustment stage of the period 3, the phase of the transmission channel is adjusted by using the phase group obtained through calculation. By analog, operations of the data collection, the machine learning, and the parameter adjustment are performed in each period.

The information processing method and the related device provided in this application are described in detail below.

Figure 5:
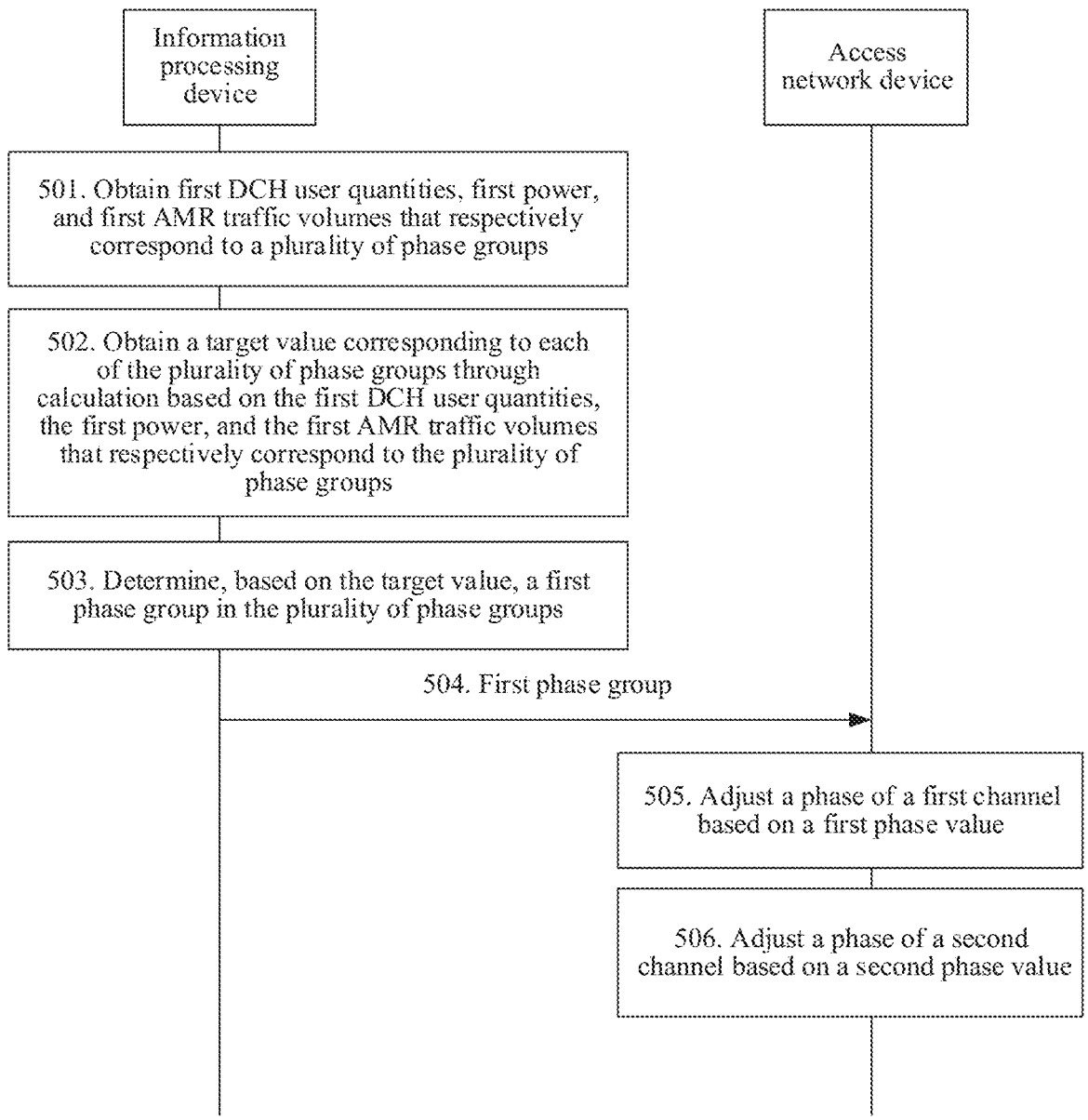
FIG. 5 is a schematic diagram of an information processing method according to an embodiment of this application.

FIG. 5 shows an information processing method according to an embodiment of this application. As shown in FIG. 5, the information processing method includes the following parts of 501 to 504:

501. An information processing device obtains first DCH user quantities, first power, and first AMR traffic volumes that respectively correspond to a plurality of phase groups.

The phase group includes a first phase value and a second phase value. The first phase value and the second phase value are used to adjust phases of different transmission channels. A first DCH user quantity corresponding to a target phase group is a user quantity obtained based on first data that is in a first period, the target phase group is any one of the plurality of phase groups, and the first period is a period next to a period in which the target phase group is determined as a first phase group. The first data in the first period is a sum of DCH user quantities that are collected in the first period and are of cells in a first common coverage area. The first power is power obtained based on a difference between second data and third data that are in the first period, the second data in the first period is a sum of non-high-speed downlink packet access power that is collected in the first period and is of the cells in the first common coverage area, the third data in the first period is a sum of common channel power that is collected in the first period and is of the cells in the first common coverage area, and the first AMR traffic volume is a traffic volume obtained based on fourth data that is in the first period. The fourth data in the first period is a sum of AMR traffic volumes that are collected in the first period and are of the cells in the first common coverage area. The first common coverage area is any common coverage area covered by the information processing device.

For example, the information processing device obtains first DCH user quantities, first power, and first AMR traffic volumes that respectively correspond to 16 phase groups. The 16 phase groups are shown in Table 1 below.

TABLE 1

| Phase group 1 | (x0 = 0, x1 = 0) |
| Phase group 2 | (x0 = 0, x1 = 90) |
| Phase group 3 | (x0 = 0, x1 = 180) |
| Phase group 4 | (x0 = 0, x1 = 270) |
| Phase group 5 | (x0 = 90, x1 = 0) |
| Phase group 6 | (x0 = 90, x1 = 90) |
| Phase group 7 | (x0 = 90, x1 = 180) |
| Phase group 8 | (x0 = 90, x1 = 270) |
| Phase group 9 | (x0 = 180, x1 = 0 |
| Phase group 10 | (x0 = 180, x1 = 90) |
| Phase group 11 | (x0 = 180, x1 = 180) |

TABLE 1-continued

| Phase group 12 | (x0 = 180, x1 = 270) |
| Phase group 13 | (x0 = 270, x1 = 0) |
| Phase group 14 | (x0 = 270, x1 = 90) |
| Phase group 15 | (x0 = 270, x1 = 180) |
| Phase group 16 | (x0 = 270, x1 = 270) |

In the table, x0 is the first phase value, and x1 is the second phase value. A first DCH user quantity corresponding to the phase group 1 is a user quantity obtained based on the first data that is in the first period. First power corresponding to the phase group 1 is power obtained based on the difference between the second data and the third data that are in the first period. A first AMR traffic volume corresponding to the phase group 1 is a traffic volume obtained based on the fourth data that is in the first period. The first period is a period next to a period in which the phase group 1 is determined as the first phase group through calculation. For example, as shown in FIG. 4, in a period 1, the phase group 1 is determined as the first phase group through calculation, and in a parameter adjustment stage of the period 1, phase adjustment is performed based on the phase group 1. In a period 2, first data corresponding to the phase group 1 is collected, where the first data is a sum of DCH user quantities of the cells in the first common coverage area, and a first DCH user quantity corresponding to the phase group 1 is obtained based on the first data. In the period 2, second data and third data corresponding to the phase group 1 are collected, where the second data is a sum of non-high-speed downlink packet access power that is collected in the period 2 and is of the cells in the first common coverage area, and the third data is a sum of common channel power that is collected in the period 2 and is of the cells in the first common coverage area; and first power corresponding to the phase group 1 is obtained based on a difference between the second data and the third data. In the period 2, fourth data corresponding to the phase group 1 is collected, where the fourth data is a sum of AMR traffic volumes that are collected in the period 2 and are of the cells in the first common coverage area, and a first AMR traffic volume corresponding to the phase group 1 is obtained based on the fourth data. In the period 2, the phase group 2 is determined as the first phase group through calculation, and in a parameter adjustment stage of the period 2, phase adjustment is performed based on the phase group 2. In a period 3, first data corresponding to the phase group 2 is collected, where the first data is a sum of DCH user quantities of the cells in the first common coverage area, and a first DCH user quantity corresponding to the phase group 2 is obtained based on the first data. In the period 3, second data and third data corresponding to the phase group 2 are collected, where the second data is a sum of non-high-speed downlink packet access power that is collected in the period 3 and is of the cells in the first common coverage area, and the third data is a sum of common channel power that is collected in the period 3 and is of the cells in the first common coverage area; and first power corresponding to the phase group 2 is obtained based on a difference between the second data and the third data. In the period 3, fourth data corresponding to the phase group 1 is collected, where the fourth data is a sum of AMR traffic volumes that are collected in the period 3 and are of the cells in the first common coverage area, and a first AMR traffic volume corresponding to the phase group 2 is obtained based on the fourth data. A first DCH user quantity, first power, and a first AMR traffic volume that correspond to another phase group are obtained in a similar manner. Details are not described herein again.

Optionally, a specific implementation in which the information processing device collects the first data, the difference between the second data and the third data, and the fourth data may include the following steps (1) to (3):

(1) Collect cell information and update the cell information in a cell information table, where the cell information table includes information about cells in all clusters in the first common coverage area. The collected cell information may include a cell identifier, a base station identifier, a frequency band identifier, a frequency identifier, a sector identifier, an AMR traffic volume, a DCH user quantity, non-high-speed downlink packet access power, and common channel power. The collected cell information includes information about central cells of all clusters in the first common coverage area, and information about all neighboring cells that have a TOP switching relationship with the central cells. The collected cell information includes information about central cells of all clusters in the first common coverage area, and information about some neighboring cells that have a TOP switching relationship with the central cells.

The neighboring cell of which the cell information is collected may be selected in the following manners:

A. For a current central cell: Use data of a day before beamforming enabling, take a statistics result by using VS.IntraFreq.Periodic.MrRpt.Ncell, and select neighboring cells for which quantities of link switching times are in top Min {5, top 80% in rank}, for cell information collection.

B. Every early morning, refresh TOP neighboring cell information of the cluster: when a neighboring cell that has a TOP switching relationship changes, processing is necessary for each change. A newly-added/newly-changed cell can be added to the TOP neighboring cell information of the cluster only when a quantity of link switching times for the cell is greater than 20% of a total quantity of link switching times for all neighboring cells. Otherwise, the information is not updated. Steps in an updating algorithm are as follows:

An intersection set is taken. First, an intersection set of new and old TOP neighboring cell information is taken, to obtain a common part. When a neighboring cell is newly added to the new TOP neighboring cell information compared with the old TOP neighboring cell information, if a quantity of switching times for any newly-added cell accounts for more than 20%, the old TOP neighboring cell information is replaced with the new TOP neighboring cell information. When a neighboring cell is deleted from the new TOP neighboring cell information compared with the old TOP neighboring cell information, if MML configuration of the deleted neighboring cell is deleted, the old TOP neighboring cell information is replaced with the new TOP neighboring cell information.

It is worth mentioning that, the non-high-speed downlink packet access power and the common channel power can be expressed as power percentages. For example, a NonH power percentage may be: $10^{\wedge}(VS.MeanTCP.NonHS/10)/10^{\wedge}(MAXTXPOWER/100)$. A PCPICH power percentage may be: $PCPICH\_Factor*10^{\wedge}(PCPICHPower/100)/10^{\wedge}(MAXTXPOWER/100)$. An SCH power percentage may be: $(PSCH\_Factor*10^{\wedge}((PCPICHPower+PSCHPower)/100)+SSCH\_Factor*10^{\wedge}((PCPICHPower+SSCHPower)/100))/10^{\wedge}(MAXTXPOWER/100)$. A BCH_PCCPCH power percentage may be: $BCH\_Factor*10^{\wedge}((PCPICHPower+BCHPower)/100)/10^{\wedge}(MAXTXPOWER\ 100)$. A PICH power percentage may be: $PICH\_Factor*10^{\wedge}((PCPICHPower+PICHPowerOffset*10)/100)/10^{\wedge}(MAXTXPOWER/100)$. MAXTXPOWER is total power of a cell. In the cell information table, the common channel power may be a sum of the PCPICH power percentage, the SCH power percentage, the BCH_PCCPCH power percentage, and the PICH power percentage.

(2) Update a cluster information table based on the cell information in the cell information table. The cluster information table includes an identifier of a cluster, and an identifier of a central cell in the cluster is usually used to represent the identifier of the cluster. The cluster information table includes a DCH user quantity, a difference between non-high-speed downlink packet access power and common channel power, and an AMR traffic volume.

A DCH user quantity of a cluster 1 in the cluster information table is a sum of DCH user quantities of all cells in the cluster 1 in the cell information table. The cluster 1 is any cluster in the cluster information table. For example, the cluster 1 includes a cell A. and a cell A1 and a cell A2 that have a Top switching relationship with the cell A. A DCH user quantity of the cell A is 1000, a DCH user quantity of the cell A1 is 1000, a DCH user quantity of the cell A1 is 1000, and therefore, the DCH user quantity of the cluster 1 is 3000.

A difference between non-high-speed downlink packet access power and common channel power of the cluster 1 in the cluster information table is equal to a sum of non-high-speed downlink packet access power of all cells in the cluster 1 in the cell information table subtracted by a sum of common channel power of all the cells in the cluster 1. For example, the cluster 1 includes a cell A. and a cell A1 and a cell A2 that have a Top switching relationship with the cell A. Non-high-speed downlink packet access power of the cell A is 40%, non-high-speed downlink packet access power of the cell A1 is 40%, non-high-speed downlink packet access power of the cell A1 is 30%, common channel power of the cell A is 20%, common channel power of the cell A1 is 30%, common channel power of the cell A1 is 30%, and therefore the difference between the non-high-speed downlink packet access power and the common channel power in the cluster 1 is: (non-high-speed downlink packet access power 40% of the cell A+non-high-speed downlink packet access power 40% of the cell A1+non-high-speed downlink packet access power 30% of the cell A2)−(common channel power 20% of the cell A+common channel power 30% of the cell A1+common channel power 30% of the cell A2)=30%.

An AMR traffic volume of the cluster 1 in the cluster information table is a sum of AMR traffic volumes of all cells in the cluster 1 in the cell information table. For example, the cluster 1 includes a cell A. and a cell A1 and a cell A2 that have a Top switching relationship with the cell A. An AMR traffic volume of the cell A is 500, an AMR traffic volume of the cell A1 is 500, an AMR traffic volume of the cell A1 is 500, and therefore, the AMR traffic volume of the cluster 1 is 1500.

(3) Update a common coverage area information table based on the information in the cluster information table. The common coverage area information table includes an identifier of a common coverage area. For example, the identifier of the common coverage area may be an identifier of the information processing device+a sector identifier+a base station identifier+a frequency band identifier. The common coverage area information table further includes a DCH user quantity, a difference between non-high-speed downlink packet access power and common channel power, and an AMR traffic volume.

A DCH user quantity of a first common coverage area in the common coverage area information table is a sum of DCH user quantities of all clusters in the first common coverage area in the cluster information table. The first common coverage area is any common coverage area in the common coverage area information table. For example, the first common coverage area includes a cluster 1 and a cluster 2. A DCH user quantity of the cluster 1 is 3000, a DCH user quantity of the cluster 2 is 2000, and therefore, the DCH user quantity of the first common coverage area is 5000.

A difference between non-high-speed downlink packet access power and common channel power of the first common coverage area in the common coverage area information table is a sum of differences between non-high-speed downlink packet access power and common channel power of all clusters in the first common coverage area in the cell information table. For example, the first common coverage area includes a cluster 1 and a cluster 2. A difference between non-high-speed downlink packet access power and common channel power of the cluster 1 is 30%, a difference between non-high-speed downlink packet access power and common channel power of the cluster 2 is 20%, and therefore, the difference between the non-high-speed downlink packet access power and the common channel power of the first common coverage area is 30%+20% and is equal to 50%.

An AMR traffic volume of the first common coverage area in the common coverage area information table is a sum of AMR traffic volumes of all clusters in the first common coverage area in the cluster information table. For example, the first common coverage area includes a cluster 1 and a cluster 2. An AMR traffic volume of the cluster 1 is 1500, an AMR traffic volume of the cluster 2 is 1000, and therefore, the AMR traffic volume in the cluster is 2500.

The DCH user quantity of the first common coverage area in the common coverage area information table is first data corresponding to the first phase group determined in a previous period. The difference between the non-high-speed downlink packet access power and the common channel power of the first common coverage area in the common coverage area information table is a difference between second data and third data corresponding to the first phase group determined in the previous period. The AMR traffic volume of the first common coverage area in the common coverage area information table is fourth data corresponding to the first phase group determined in the previous period.

For example, the first phase group determined in the previous period is the phase group 1. The information processing device can obtain a first DCH user quantity corresponding to the phase group 1 based on the first data. The information processing device can obtain first power corresponding to the phase group 1 based on the difference between the second data and the third data. The information processing device can obtain a first AMR traffic volume corresponding to the phase group 1 based on the fourth data.

As showing in the following Table 2, the information processing device stores the first DCH user quantities, the first power, and the first AMR traffic volumes that correspond to the preset plurality of phase groups.

For example, the phase group 1 is determined as the first phase group in the period 1, and the first data, the difference between the second data and the third data, and the fourth data that correspond to the phase group 1 are collected in the period 2. In the period 2, the first DCH user quantity corresponding to the phase group 1 is obtained based on the first data, the first power corresponding to the phase group 1 is obtained based on the difference between the second data and the third data, and the first AMR traffic volume corresponding to the phase group 1 is obtained based on the fourth data. In the period 2, the first DCH user quantity, the first power, and the first AMR traffic volume that correspond to the phase group 1 are stored. The phase group 2 is determined as the first phase group in the period 2, and the first data, the difference between the second data and the third data, and the fourth data that correspond to the phase group 2 are collected in the period 3. In the period 3, the first DCH user quantity corresponding to the phase group 2 is obtained based on the first data, the first power corresponding to the phase group 2 is obtained based on the difference between the second data and the third data, and the first AMR traffic volume corresponding to the phase group 2 is obtained based on the fourth data. In the period 3, the first DCH user quantity, the first power, and the first AMR traffic volume that correspond to the phase group 1 are stored. Similar operations are performed in another period.

TABLE 2

| Common coverage area | Phase group | First DCH user quantity | First power | First AMR traffic volume |
|---|---|---|---|---|
| First common coverage area | Phase group 1 | 5000 | 40% | 4500 |
| | Phase group 2 | 4500 | 40% | 3000 |
| | Phase group 3 | 4000 | 50% | 3000 |
| | Phase group 4 | 5000 | 40% | 2000 |
| | Phase group 5 | 4500 | 60% | 2000 |
| | Phase group 6 | 3000 | 40% | 2000 |
| | Phase group 7 | 4500 | 70% | 3000 |
| | Phase group 8 | 5000 | 50% | 2000 |
| | Phase group 9 | 4500 | 60% | 600 |
| | Phase group 10 | 4500 | 30% | 2000 |
| | Phase group 11 | 3000 | 20% | 500 |
| | Phase group 12 | 5000 | 40% | 2000 |
| | Phase group 13 | 2000 | 60% | 400 |
| | Phase group 14 | 1000 | 80% | 500 |
| | Phase group 15 | 3000 | 40% | 2000 |
| | Phase group 16 | 4500 | 40% | 2000 |

Optionally, a specific implementation in which the information processing device obtains the first DCH user quantity corresponding to the phase group based on the first data, obtains the first power corresponding to the phase group based on the difference between the second data and the third data, and obtains the first AMR traffic volume corresponding to the phase group based on the fourth data may be: the information processing device may not perform a filtering operation, directly determine the first data as the first DCH user quantity corresponding to the phase group, directly determine the difference between the second data and the third data as the first power corresponding to the phase group, and directly determine the fourth data as the first AMR traffic volume corresponding to the phase group.

Optionally, after the information processing device collects the first data, the difference between the second data and the third data, and the fourth data that are in the current period, the following steps (4) to (6) may be performed:

(4) Filter the first data that is in the current period, and obtain and store a first DCH user quantity corresponding to the first phase group determined in the previous period.

$$\text{filter\_Q1} = \left(1 - \frac{1}{n}\right) * \text{filter\_Q1} + \frac{1}{n} * Q1,$$

where filter_Q1 is the first DCH user quantity corresponding to the first phase group determined in the previous period, Q1 is the first data collected in the current period, and n is a dynamic filtering coefficient of the first phase group determined in the previous period;

(5) Filter the difference between the second data and the third data that are in the current period, and obtain and store first power corresponding to the first phase group determined in the previous period.

$$\text{filter\_Q2} = \left(1 - \frac{1}{n}\right) * \text{filter\_Q2} + \frac{1}{n} * Q2,$$

where filter_Q2 is the first power corresponding to the first phase group determined in the previous period, Q2 is the difference between the second data and the third data collected in the current period, and n is the dynamic filtering coefficient of the first phase group determined in the previous period;

(6) Filter the fourth data that is in the current period, and obtain and store a first AMR traffic volume corresponding to the first phase group determined in the previous period.

$$\text{filter\_Q3} = \left(1 - \frac{1}{n}\right) * \text{filter\_Q3} + \frac{1}{n} * Q3,$$

where filter_Q3 is the first AMR traffic volume corresponding to the first phase group determined in the previous period, Q3 is the fourth data collected in the current period, and n is the dynamic filtering coefficient of the first phase group determined in the previous period.

That is, in this implementation, the information processing device obtains the first DCH user quantity corresponding to the phase group by filtering the first data, obtains the first power corresponding to the phase group by filtering the difference between the second data and the third data, and obtains the first AMR traffic volume corresponding to the phase group by filtering the fourth data.

For example, the first phase group determined in the previous period is the phase group 1, and in the current period, first data, a difference between second data and third data, and fourth data corresponding to the phase group 1 are collected. A first DCH user quantity corresponding to the phase group 1 is $$\text{filter\_Q1} = \left(1 - \frac{1}{n}\right) * \text{filter\_Q1} + \frac{1}{n} * Q1,$$

where Q1 is the first data corresponding to the phase group 1, and n is a dynamic filtering coefficient corresponding to the phase group 1. Similarly, $$\text{filter\_Q2} = \left(1 - \frac{1}{n}\right) * \text{filter\_Q2} + \frac{1}{n} * Q2,$$

where filter_Q2 is first power corresponding to the phase group 1, Q2 is the difference between the second data and the third data collected in the current period and corresponding to the phase group 1, and n is the dynamic filtering coefficient corresponding to the phase group 1. Similarly, $$\text{filter\_Q3} = \left(1 - \frac{1}{n}\right) * \text{filter\_Q3} + \frac{1}{n} * Q3,$$

where filter_Q3 is a first AMR traffic volume corresponding to the phase group 1, Q3 is the fourth data collected in the current period and corresponding to the phase group 1, and n is the dynamic filtering coefficient corresponding to the phase group 1.

Certainly, the first data, the difference between the second data and the third data, and the fourth data may be filtered by using first data, a difference between second data and third data, and fourth data that are collected in each period by the information processing device, to obtain a first DCH user quantity, first power, and a first AMR traffic volume corresponding to a phase group determined in the previous period.

According to this implementation, the first data, the difference between the second data and the third data, and the fourth data corresponding to the phase group can be filtered (abnormal data can be filtered out) to obtain the first DCH user quantity, the first power, and the first AMR traffic volume. Based on the first DCH user quantity, the first power, and the first AMR traffic volume, a target value corresponding to each phase group and used to represent a capacity can be obtained through calculation more accurately.

Optionally, a specific implementation of filtering the first data that is in the current period may be: if the first data in the current period is greater than zero, filtering the first data that is in the current period. A specific implementation of filtering the difference between the second data and the third data that are in the current period may be: if the difference between the second data and the third data in the current period is greater than zero, filtering the difference between the second data and the third data that are in the current period. A specific implementation of filtering the fourth data that is in the current period may be: if the fourth data in the current period is greater than zero, filtering the fourth data that is in the current period.

In this implementation, if it is determined that the first data is greater than zero, the first data is proved to be normal, and a subsequent filtering operation can be performed. Optionally, if the first data is less than or equal to zero, or if the first data is null or an invalid value, it is determined that the first data is abnormal. In this case, valid iteration periods may not be accumulated, and the first data is not filtered. For example, the abnormal first data corresponds to a phase group 1, and a first DCH user quantity corresponding to the phase group 1 is historically stored. In this case, a target value corresponding to the phase group 1 is calculated based on the historically stored first DCH user quantity.

Similarly, if it is determined that the difference between the second data and the third data is greater than zero, the difference between the second data and the third data is proved to be normal, and a subsequent filtering operation can be performed. Optionally, if the difference between the second data and the third data is less than or equal to zero, or if the difference between the second data and the third data is null or an invalid value, it is determined that the difference between the second data and the third data is abnormal. In this case, valid iteration periods may not be accumulated, and the difference between the second data and the third data is not filtered. For example, the abnormal difference between the second data and the third data corresponds to the phase group 1, and first power corresponding to the phase group 1 is historically stored. In this case, the target value corresponding to the phase group 1 is calculated based on the historically stored first power.

Similarly, if it is determined that a difference of the fourth data is greater than zero, the fourth data is proved to be normal, and a subsequent filtering operation can be performed. Optionally, if the fourth data is less than or equal to zero, or if the fourth data is null or an invalid value, it is determined that the fourth data is abnormal. In this case, valid iteration periods may not be accumulated, and the fourth data is not filtered. For example, the abnormal fourth data corresponds to the phase group 1, and a first AMR traffic volume corresponding to the phase group 1 is historically stored. In this case, the target value corresponding to the phase group 1 is calculated based on the historically stored first AMR traffic volume.

Optionally, if the first data, the difference between the second data and the third data, and the fourth data are all abnormal, accumulating performed on the valid iteration period may be skipped, and the subsequent operations are skipped. However, the filtering coefficient is normally refreshed.

Abnormality determining is first performed on the first data, the difference between the second data and the third data, and the fourth data, and filtering is then performed, to ensure that the target value used to represent the system capacity can be accurately obtained through calculation based on the obtained first DCH user quantity, first power, and first AMR traffic volume.

Optionally, a specific implementation of filtering the first data that is in the current period may be: if $|M1-Mean1| \leq (4*SrdevScov1)$ is satisfied, filtering the first data that is in the current period, where M1 is the first data in the current period, Mean1 is an average value of a sum of DCH user quantities that are collected at a preset quantity of traffic statistics time points and are of all the cells in the first common coverage area, and StdevScov1 is a standard deviation of the sum of the DCH user quantities of all the cells in the first common coverage area. A specific implementation of filtering the difference between the second data and the third data that are in the current period may be: if $|M2-Mean2| \leq (4*StdevScov2)$ is satisfied, filtering the difference between the second data and the third data that are in the current period, where M2 is the difference between the second data and the third data in the current period, Mean1 is an average value of differences that are collected at the preset quantity of traffic statistics time points and are between first non-high-speed downlink packet access power and first common channel power of all the cells in the first common coverage area, and StdevScov2 is a standard deviation of the differences between the first non-high-speed downlink packet access power and the first common channel power of all the cells in the first common coverage area. A specific implementation of filtering the fourth data that is in the current period may be: if $|M3-Mean3| \leq (4*StdevScov3)$ is satisfied, filtering the fourth data that is in the current period, where M1 is the fourth data in the current period, Mean3 is an average value of a sum of AMR traffic volumes that are collected at the preset quantity of traffic statistics time points and are of all the cells in the first common coverage area, and StdevScov3 is a standard deviation of the sum of the AMR traffic volumes of all the cells in the first common coverage area.

In this implementation, if $|M1-Mean1| \leq (4*StdevScov1)$, it is proved that the first data is normal, and a subsequent filtering operation can be performed. Otherwise, it is determined that the first data is abnormal. In this case, valid iteration periods may not be accumulated, and the first data is not filtered. For example, the abnormal first data corresponds to a phase group 1, and a first DCH user quantity corresponding to the phase group 1 is historically stored. In this case, a target value corresponding to the phase group 1 is calculated based on the historically stored first DCH user quantity.

Similarly, if $|M2-Mean2| \leq (4*StdevScov2)$, it is proved that the difference between the second data and the third data is normal, and a subsequent filtering operation can be performed. Optionally, if the difference between the second data and the third data is less than or equal to zero, or if the difference between the second data and the third data is null or an invalid value. Otherwise, it is determined that the difference between the second data and the third data is abnormal. In this case, accumulating performed on the valid iteration period may be skipped, and the difference between the second data and the third data is not filtered. For example, the abnormal difference between the second data and the third data corresponds to the phase group 1, first power corresponding to the phase group 1 is historically stored, and therefore, the target value corresponding to the phase group 1 is calculated based on the historically stored first power.

Similarly, if $|M3-Mean3| \leq (4*StdevScov3)$, it is proved that the fourth data is normal, and a subsequent filtering operation can be performed. Otherwise, it is determined that the fourth data is abnormal. In this case, accumulating performed on the valid iteration period may be skipped, and the fourth data is not filtered. For example, the abnormal fourth data corresponds to the phase group 1, a first AMR traffic volume corresponding to the phase group 1 is historically stored, and therefore, the target value corresponding to the phase group 1 is calculated based on the historically stored first AMR traffic volume.

502. The information processing device obtains the target value corresponding to each of the plurality of phase groups through calculation based on the first DCH user quantities, the first power, and the first AMR traffic volumes that respectively correspond to the plurality of phase groups. The target value is used to represent the system capacity.

Optionally, a specific implementation in which the information processing device obtains the target value corresponding to each of the plurality of phase groups through calculation based on the first DCH user quantities, the first power, and the first AMR traffic volumes that respectively correspond to the plurality of phase groups may include the following steps (7) to (9):

(7) For any phase group in the plurality of phase groups, obtain R_Capacity(k) corresponding to the phase group based on a first DCH user quantity and first power that correspond to the phase group.

$$R\_Capacity(k) = \frac{Capacity(k)}{Capacity(Baseline)},$$

where k corresponds to a $k^{th}$ phase group in the plurality of phase groups, Capacity(k) is a capacity value corresponding to the $k^{th}$ phase group, Capacity(k) is equal to a first DCH user quantity corresponding to the $k^{th}$ phase group divided by first power corresponding to the $k^{th}$ phase group, and Capacity(Baseline) is an average value of capacity values corresponding to all of the plurality of phase groups.

(8) Obtain R_AMR(k) based on a first AMR traffic volume corresponding to the phase group. If a difference between AMR(k) and AMR(Baseline) is less than −AMR-Scov. R_AMR(k) is 0, and if the difference between AMR(k) and AMR(Baseline) is greater than or equal to −AMRScov, R_AMR(k) is 1; AMR(k) is a first AMR traffic volume corresponding to the $k^{th}$ phase group, and AMR(Baseline) is an average value of the first AMR traffic volumes corresponding to all of the plurality of phase groups; and AMR-Scov is an AMR tolerance threshold of a common coverage area level.

(9) Use a product of R_Capacity(k) and R_AMR(k) as the target value.

For example, the plurality of phase groups are the 16 phase groups shown in Table 1, and the phase group 1 corresponds to R_Capacity(1). R_Capacity(1) is equal to a capacity value corresponding to the phase group 1 divided by an average value of capacity values corresponding to the 16 phase groups. The capacity value corresponding to the phase group 1 is equal to the first DCH user quantity corresponding to the phase group 1 in Table 2 divided by the first power corresponding to the phase group 1. The phase group 1 corresponds to R_AMR(1). If a difference between AMR(1) and AMR(Baseline) is less than −AMRScov. R_AMR(1) is 0. If the difference between AMR(1) and AMR(Baseline) is greater than or equal to −AMRScov, R_AMR(1) is 1. AMR(1) is the first AMR traffic volume corresponding to the phase group 1 in Table 2. AMR (Baseline) is an average value of first AMR traffic volumes corresponding to the 16 phase groups. The information processing device uses a product of R_Capacity(1) and R_AMR(1) as the target value corresponding to the phase group 1. A manner of calculating a target value corresponding to another phase group is similar to that of the phase group 1. Details are not described herein again.

It can be seen that, according to this implementation, the target value used to represent the system capacity can be accurately obtained through calculation.

Optionally, a manner of calculating AMRScov is as follows: AMRScov=Xmax*StdevScov. Xmax is a deterioration standard deviation coefficient of the AMR traffic volume of the first common coverage area and has a value of 2; and StdevScov is a standard deviation of the AMR traffic volume of the first common coverage area.

Optionally, after obtaining R_AMR(k) based on the first AMR traffic volume corresponding to the phase group, the following steps (10) and (11) may be further performed:

(10) Calculate AMR_Total_Baseline, where AMR_Total_Baseline is a sum of AMR(Baseline) of all common coverage areas covered by the information processing device corresponding to the first common coverage area.

(11) If AMR_Total_Baseline is not equal to 0 and satisfies $$\frac{AMR\_Total\_Mean}{AMR\_Total\_Baseline} \langle 1 - AMR\_Total\_Thld,$$

update R_AMR(k) that corresponds to some common coverage areas covered by the information processing device corresponding to the first common coverage area and corresponds to a first phase group determined in a second period to zero, where the second period is two subtracted from the current period, AMR_Total_Mean is an average value of AMR traffic volumes corresponding to all common coverage areas in a total area covered by the information processing device, and AMR_Total_Thld is an AMR tolerance threshold of a total area level of the information processing device corresponding to the first common coverage area.

Optionally, a quantity of the some common coverage areas covered by the information processing device may be N_Total. N_Total is equal to a total quantity of all the common coverage areas covered by the information processing device*10%. Sorting all the common coverage areas covered by the information processing device in ascending order of Y, the some common coverage area covered by the information processing device may be top N_Total common coverage areas in rank. Y is equal to subtracting AMR (State_k) by AMR(Baseline).

For example, the information processing device includes common coverage areas 1 to 30. Therefore, N_Total is equal to 3. Performing sorting in ascending order of Y, first three common coverage areas are common coverage area 1, common coverage area 2, and common coverage area 3. Therefore, if the current period is a period 3, and if AMR_Total_Baseline is not equal to 0 through calculation in the current $$\frac{AMR\_Total\_Mean}{AMR\_Total\_Baseline} \langle 1 - AMR\_Total\_Thld \text{ is satisfied,}$$

R_AMR(k) corresponding to a first phase group determined in a period 1 of the common coverage area 1 is updated to zero, R_AMR(k) corresponding to a first phase group determined in a period 1 of the common coverage area 2 is updated to zero, and R_AMR(k) corresponding to a first phase group determined in a period 1 of the common coverage area 3 is updated to zero.

Optionally, a method for calculating AMR_Total_Thld (the AMR tolerance threshold of the total area level of the information processing device corresponding to the first common coverage area) may be as follows:

If a quantity of second AMR traffic volumes in the total area covered by the information processing device stored in recent periods is less than 100: after calculating a standard deviation and an average value by using Total-level data of the information processing device in a period before beamforming enabling, AMR_Total_Thld is calculated according to the following formula: AMR_Total_Thld=Stdev_total/Mean_total. The second AMR traffic volume is a sum of the first AMR traffic volumes of all the common coverage areas in the total area covered by the information processing device. Stdev_total is the standard deviation of the second AMR traffic volumes. Mean_total is the average value of the second AMR traffic volumes.

If the quantity of pieces of stored Total data in recent periods is greater than or equal to 100, after calculating the standard deviation and the average value of the total area covered by the information processing device by using most recent 100 pieces of data, AMR_Total_Thld is calculated according to the following formula:

$$AMR\_Total\_Thld=2*Stdev\_total/Mean\_total.$$

If a quantity of the periods is less than 100, Stdev_total and Mean_total are calculated in the first period, and are not updated in 100 periods. If the quantity of the periods is greater than or equal to 100, Stdev_total and Mean_total are calculated in each period.

It can be seen that, according to this implementation, the target value used to represent the system capacity can be accurately obtained through calculation.

503. The information processing device determines, based on the target value, the first phase group in the plurality of phase groups.

Optionally, a specific implementation in which the information processing device determines, based on the target value, the first phase group in the plurality of phase groups may be:

obtaining, based on a currently used phase group, a preset quantity of second phase groups in the plurality of phase groups, where a difference between a first phase value in the second phase group and a first phase value in the first phase group determined in a previous period is not greater than a preset degree, and a difference between a second phase value in the second phase group and a second phase value in the first phase group determined in the previous period is not greater than the preset degree; obtaining, in the preset quantity of second phase groups, a second phase group with a greatest target value; calculating a first selection probability of the second phase group with the greatest target value, where A=1−ε, A is the first selection probability, $$\varepsilon = \max\left(\min\left(\frac{1}{\sqrt{(0.1*t)}}, \frac{N-1}{N}\right), 0.1\right),$$

t is a valid iteration period number, the valid iteration period number is a number of a period in which the phases of the transmission channels are adjusted by using a phase group, and N is equal to the preset quantity; calculating a second selection probability of a phase group in the preset quantity of second phase groups except the second phase group with the greatest target value, where $$B = \frac{\varepsilon}{N-1},$$

and B is the second selection probability; and randomly selecting, based on the first selection probability and the second selection probability, a phase group in the preset quantity of second phase groups as the first phase group.

The preset degree may be less than or equal to 90 degrees.

For example, the phase group determined in the previous period is a phase group 2 (x0=0, x1=90), the first phase value in the second phase group is x0={mod(x0 of the phase group 2−90, 360), x0 of the phase group 2, mod(x0 of the phase group 2+90, 360)}; and the second phase value in the second phase group is x1={mod(x1 of the phase group 2−90, 360), x1 of the phase group 2, mod(x1 of the phase group 2+90, 360)}. Therefore, the first phase value in the second phase group is x0={mod(0−90, 360)=270, 0, mod(0+90, 360)=90}, and the second phase value in the second phase group is x1={mod(90−90, 360)=0, 0, mod(90+90, 360)=180}. Therefore, there are totally 9 second phase groups: a second phase group 1 (x0=0, x1=90), a second phase group 2 (x0=0, x1=180), a second phase group 3 (x0=0, x1=0), a second phase group 4 (x0=90, x1=90), a second phase group 5 (x0=90, x1=180), a second phase group 6 (x0=90, x1=0), a second phase group 7 (x0=270, x1=90), a second phase group 8 (x0=270, x1=180), and a second phase group 9 (x0=270, x1=0).

The target values of the second phase groups obtained through calculation are shown in the following Table 3. The information processing device obtains, in the second phase groups, the phase group 9 with the greatest target value, and calculates a first selection probability of the phase group 9 and second selection probabilities of the phase group 1 to 8. As shown in Table 3, the first selection probability is 73.36%, and the second selection probabilities are 3.33%. The information processing device allocates a random number range corresponding each second phase group based on the first selection probability and the second selection probabilities. The information processing device generates a random number, and if the random number belongs to a random number range corresponding to the second phase group 9, selects the second phase group 9 as the first phase group. Similarly, if the random number belongs to a random number range corresponding to the second phase group 1, the second phase group 1 is selected as the first phase group. Processing for the other phase groups is similar.

TABLE 3

| Second phase group | Target value | Selection probability | Random number range (0 to 9999) |
|---|---|---|---|
| Second phase group 1 | 1 | 3.33% | 0 to 332 |
| Second phase group 2 | 1.05 | 3.33% | 333 to 665 |
| Second phase group 3 | 1.1 | 3.33% | 666 to 998 |
| Second phase group 4 | 1.02 | 3.33% | 999 to 1331 |
| Second phase group 5 | 1.12 | 3.33% | 1332 to 1664 |
| Second phase group 6 | 1.13 | 3.33% | 1665 to 1997 |
| Second phase group 7 | 1.14 | 3.33% | 1998 to 2330 |
| Second phase group 8 | 1.15 | 3.33% | 2331 to 2663 |
| Second phase group 9 | 1.2 | 73.36% | 2664 to 9999 |
| | | Ensure that a sum of the foregoing probabilities is 100% | |

504. The information processing device sends the first phase group to an access network device.

The first phase group is used by the access network device to adjust the phase of the transmission channel by using the first phase group in a current period.

505. The access network device adjusts a phase of a first transmission channel based on the first phase value.

506. The access network device adjusts a phase of a second transmission channel based on the second phase value.

After the access network device receives the first phase group sent by the information processing device, the access network device adjusts the phase of the first transmission channel based on the first phase value, and adjusts the phase of the second transmission channel based on the second phase value.

The first transmission channel and the second transmission channel belong to different polarization groups.

For example, a cell includes 4 transmission channels: transmission channels 1 to 4. The transmission channel 1 and the transmission channel 3 are in a same polarization direction, and the transmission channel 2 and the transmission channel 4 are in a same polarization direction. P0 is a current phase value of the transmission channel 3, and P1 is a current phase value of the transmission channel 4. The access network device, after receiving the first phase group, adjusts a phase of the transmission channel 3 to a sum of the first phase value x0 of the first phase group and P0, and adjusts a phase of the transmission channel 4 to a sum of the second phase value x1 of the first phase group and P1. For example, P0 is 0. P1 is 90, the first phase value x0 of the first phase group is 90, and the second phase value x1 is 90.

Therefore, the phase of the transmission channel 3 is adjusted to 90, and the phase of the transmission channel 4 is adjusted to 180.

It can be learned that, according to the method described in FIG. 5, the information processing device can select, based on the target value used to represent a size of the system capacity, the first phase group to adjust the phase of the transmission channel of the cell. After adjusting the phase by using the phase group with the greatest target value, the system capacity is largest. A probability that the phase group with the greatest target value is the first phase group is largest. Therefore, adjusting the phase by using the first phase group can implement beamforming and is beneficial to improving the system capacity.

Optionally, a specific implementation of adjusting the phase of the first transmission channel based on the first phase value may be: adjusting, at a preset adjustment speed, the phase of the first transmission channel based on the first phase value. A specific implementation of adjusting the phase of the second transmission channel based on the second phase value may be: adjusting, at the preset adjustment speed, the phase of the first transmission channel based on the second phase value.

For example, the first phase value is 90, and the second phase value is 90. The access network device may adjust the phases of the first transmission channel and the second transmission channel at an adjustment speed of 15 degrees/second. That is, the access network device adds 15 degrees to the phase of the first transmission channel per second until 90 degrees are added. The access network device adds 15 degrees to the phase of the second transmission channel per second until 90 degrees are added.

Optionally, a difference between the first phase value in the first phase group and a first phase value in a first phase group determined in a previous period is not greater than a preset degree, and a difference between the second phase value in the first phase group and a second phase value in the first phase group determined in the previous period is not greater than the preset degree.

For example, the phase group determined in the previous period is the phase group 2 (x0=0, x1=90). The first phase group may be one of the following phase groups: (x0=0, x1=90), (x0=0, x1=180), (x0=0, x1=0), (x0=90, x1=90), (x0=90, x1=180), (x0=90, x1=0), (x0=270, x1=90), (x0=270, x1=180), and (x0=270, x1=0).

Optionally, the first phase group is used by the access network device to adjust a phase of a transmission channel of a first cell in the first common coverage area by using the first phase group in the current period, and the information processing device may further obtain a third phase group used to adjust a phase of a transmission channel of a second cell in the first common coverage area, and send the third phase group to the access network device. Accordingly, the access network device may further receive the third phase group sent by the information processing device and used to perform the phase adjustment on the transmission channel of the second cell in the first common coverage area; adjust a phase of a first transmission channel of the second cell based on a first phase value in the third phase group; and adjust a phase of a second transmission channel of the second cell based on a second phase value in the third phase group.

The third phase group is obtained based on the first phase group, the first cell and the second cell are different, the first phase group and the second phase group are different, if there are a plurality of second cells, third phase groups respectively corresponding to the second cells are different, and the first cell and the second cell are central cells of clusters in the first common coverage area; and the first transmission channel of the second cell and the second transmission channel of the second cell belong to different polarization groups.

A principle of adjusting, by the information processing device, the transmission channel of the second cell based on the third phase group is the same as a principle of adjusting the transmission channel of the first cell based on the first phase group. Details are not described herein again.

Specifically, if a central cell of a cluster is a cell in which beamforming is enabled, the information processing device generates a third phase group corresponding to the central cell of the cluster. If a central cell of a cluster is a cell in which beamforming is not enabled, the information processing device skips generating a third phase group corresponding to the central cell of the cluster.

For example, a quantity of cells that are in central cells of all clusters in the first common coverage area and in which a preset feature of beam refinement of a transmission channel is enabled is N_4T. In ascending order of cell IDs, the N_4T cells are respectively marked as Cell 1, Cell 2, Cell 3, Cell 4, . . . Cell 8.

A phase adjustment value of each cell is assigned based on a value of N_4T and the first phase group.

If N_4T=1, a phase of a transmission channel of the Cell 1 is adjusted by using the first phase group; and the information processing device sends only the first phase group corresponding to the Cell 1 to the access network device. The access network device adjusts the phase of the transmission channel of the Cell 1 based on the first phase group.

If N_4T=2, the phase of the transmission channel of the Cell 1 is adjusted by using the first phase group, and a phase of a transmission channel of the Cell 2 is adjusted by using the third phase group. The first phase value in the third phase group is the first phase value in the first phase group plus 180, and the second phase value in the third phase group is the second phase value in the first phase group plus 180. That is, the third phase group is (x0 of the first phase group+180, x1 of the first phase group+180). The information processing device sends the first phase group corresponding to the Cell 1 to the access network device, and sends the third phase group corresponding to the Cell 2 to the access network device.

If N_4T=3, the phase of the transmission channel of the Cell 1 is adjusted by using the first phase group, the phase of the transmission channel of the Cell 2 is adjusted by using a third phase group 1. The third phase group 1 is (x0 of the first phase group+90, x1 of the first phase group+90). A phase of a transmission channel of the Cell 3 is adjusted by using a third phase group 2. The third phase group 2 is (x0 of the first phase group+180, x1 of the first phase group+180). The information processing device sends the first phase group corresponding to the Cell 1 to the access network device, and sends the third phase group 1 and the third phase group 2 to the access network device.

If N_4T=4, the phase of the transmission channel of the Cell 1 is adjusted by using the first phase group, the phase of the transmission channel of the Cell 2 is adjusted by using the third phase group 1. The third phase group 1 is (x0 of the first phase group+90, x1 of the first phase group+90). The phase of the transmission channel of the Cell 3 is adjusted by using the third phase group 2. The third phase group 2 is (x0 of the first phase group+180, x1 of the first phase group+180). A phase of a transmission channel of the Cell 4 is adjusted by using a third phase group 3. The third phase group 3 is (x0 of the first phase group+270, x1 of the first phase group+270). The information processing device sends the first phase group corresponding to the Cell 1 to the access network device, and sends the third phase group 1 to the third phase group 3 to the access network device.

If N_4T=5, the phase of the transmission channel of the Cell 1 is adjusted by using the first phase group, the phase of the transmission channel of the Cell 2 is adjusted by using the third phase group 1. The third phase group 1 is (x0 of the first phase group+60, x1 of the first phase group+60). The phase of the transmission channel of the Cell 3 is adjusted by using the third phase group 2. The third phase group 2 is (x0 of the first phase group+120, x1 of the first phase group+120). The phase of the transmission channel of the Cell 4 is adjusted by using the third phase group 3. The third phase group 3 is (x0 of the first phase group+180, x1 of the first phase group+180). A phase of a transmission channel of the Cell 5 is adjusted by using a third phase group 4. The third phase group 4 is (x0 of the first phase group+240, x1 of the first phase group+240). The information processing device sends the first phase group corresponding to the Cell 1 to the access network device, and sends the third phase group 1 to the third phase group 4 to the access network device.

If N_4T=6, the phase of the transmission channel of the Cell 1 is adjusted by using the first phase group, the phase of the transmission channel of the Cell 2 is adjusted by using the third phase group 1. The third phase group 1 is (x0 of the first phase group+60, x1 of the first phase group+60). The phase of the transmission channel of the Cell 3 is adjusted by using the third phase group 2. The third phase group 2 is (x0 of the first phase group+120, x1 of the first phase group+120). The phase of the transmission channel of the Cell 4 is adjusted by using the third phase group 3. The third phase group 3 is (x0 of the first phase group+180, x1 of the first phase group+180). The phase of the transmission channel of the Cell 5 is adjusted by using the third phase group 4. The third phase group 4 is (x0 of the first phase group+240, x1 of the first phase group+240). A phase of a transmission channel of the Cell 6 is adjusted by using a third phase group 5. The third phase group 5 is (x0 of the first phase group+300, x1 of the first phase group+300). The information processing device sends the first phase group corresponding to the Cell 1 to the access network device, and sends the third phase group 1 to the third phase group 5 to the access network device.

If N_4T=7, the phase of the transmission channel of the Cell 1 is adjusted by using the first phase group, the phase of the transmission channel of the Cell 2 is adjusted by using the third phase group 1. The third phase group 1 is (x0 of the first phase group+45, x1 of the first phase group+45). The phase of the transmission channel of the Cell 3 is adjusted by using the third phase group 2. The third phase group 2 is (x0 of the first phase group+90, x1 of the first phase group+90). The phase of the transmission channel of the Cell 4 is adjusted by using the third phase group 3. The third phase group 3 is (x0 of the first phase group+135, x1 of the first phase group+135). The phase of the transmission channel of the Cell 5 is adjusted by using the third phase group 4. The third phase group 4 is (x0 of the first phase group+180, x1 of the first phase group+180). The phase of the transmission channel of the Cell 6 is adjusted by using the third phase group 5. The third phase group 5 is (x0 of the first phase group+225, x1 of the first phase group+225). A phase of a transmission channel of the Cell 7 is adjusted by using a third phase group 6. The third phase group 6 is (x0 of the first phase group+270, x1 of the first phase group+270). The information processing device sends the first phase group corresponding to the Cell 1 to the access network device, and sends the third phase group 1 to the third phase group 6 to the access network device.

If N_4T=8, the phase of the transmission channel of the Cell 1 is adjusted by using the first phase group, the phase of the transmission channel of the Cell 2 is adjusted by using the third phase group 1. The third phase group 1 is (x0 of the first phase group+45, x1 of the first phase group+45). The phase of the transmission channel of the Cell 3 is adjusted by using the third phase group 2. The third phase group 2 is (x0 of the first phase group+90, x1 of the first phase group+90). The phase of the transmission channel of the Cell 4 is adjusted by using the third phase group 3. The third phase group 3 is (x0 of the first phase group+135, x1 of the first phase group+135). The phase of the transmission channel of the Cell 5 is adjusted by using the third phase group 4. The third phase group 4 is (x0 of the first phase group+180, x1 of the first phase group+180). The phase of the transmission channel of the Cell 6 is adjusted by using the third phase group 5. The third phase group 5 is (x0 of the first phase group+225, x1 of the first phase group+225). The phase of the transmission channel of the Cell 7 is adjusted by using the third phase group 6. The third phase group 6 is (x0 of the first phase group+270, x1 of the first phase group+270). A phase of a transmission channel of the Cell 8 is adjusted by using a third phase group 7. The third phase group 7 is (x0 of the first phase group+315, x1 of the first phase group+315). The information processing device sends the first phase group corresponding to the Cell 1 to the access network device, and sends the third phase group 1 to the third phase group 7 to the access network device.

According to this implementation, multi-carrier heterogeneity can be implemented. That is, beamforming is performed on different carriers of a same sector to form a staggered complementary coverage, and UE can obtain a capacity gain by inter-frequency re-selection and inter-frequency switching to an optimal carrier.

Optionally, if the access network device does not receive the first phase group within a preset time period, the access network device obtains a default phase group; adjusts the phase of the first transmission channel based on a first phase value in the default phase group; and adjusts the phase of the second transmission channel based on a second phase value in the default phase group.

It is worth mentioning that, the information processing device may alternatively be a base station in a 4G mobile communications system, a 5G mobile communications system, or a future mobile communications system. If the information processing device is a base station in a 4G mobile communications system, a 5G mobile communications system, or a future mobile communications system, the information processing device may further perform the steps of the access network device. The information processing device skips sending the first phase group to the access network device. To be specific, the information processing device and the access network device are one device, and the information processing device, after generating the first phase group, directly adjusts the transmission channel based on the first phase group.

In the embodiments of the present invention, functional modules of the device may be divided based on the foregoing method examples. For example, each functional module may be divided according to each function, or two or more functions may be integrated into one module. The integrated module may be implemented in a form of hardware, or may be implemented in a form of a software functional module. It should be noted that, in this embodiment of the present invention, module division is exemplary, and is merely a logical function division. In actual implementation, another division manner may be used.

Figure 6:
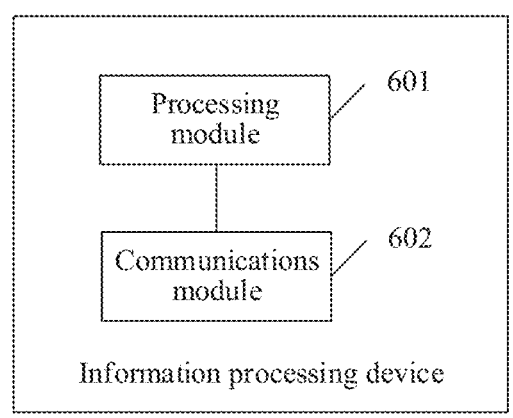
FIG. 6 is a schematic structural diagram of an information processing device according to an embodiment of this application.

FIG. 6 shows an information processing device according to an embodiment of the present invention. The information processing device includes a processing module 601 and a communications module 602.

The processing module 601 is configured to obtain first dedicated channel DCH user quantities, first power, and first adaptive multi-rate AMR traffic volumes that respectively correspond to a plurality of phase groups, where the phase group includes a first phase value and a second phase value, the first phase value and the second phase value are used to adjust phases of different transmission channels, a first DCH user quantity corresponding to a target phase group is a user quantity obtained based on first data that is in a first period, the target phase group is any one of the plurality of phase groups, the first period is a period next to a period in which the target phase group is determined as a first phase group, the first data in the first period is a sum of DCH user quantities that are collected in the first period and are of cells in a first common coverage area, the first power is power obtained based on a difference between second data and third data that are in the first period, the second data in the first period is a sum of non-high-speed downlink packet access power that is collected in the first period and is of the cells in the first common coverage area, the third data in the first period is a sum of common channel power that is collected in the first period and is of the cells in the first common coverage area, the first AMR traffic volume is a traffic volume obtained based on fourth data that is in the first period, and the fourth data in the first period is a sum of AMR traffic volumes that are collected in the first period and are of the cells in the first common coverage area;

the processing module 601 is further configured to obtain a target value corresponding to each of the plurality of phase groups through calculation based on the first DCH user quantities, the first power, and the first AMR traffic volumes that respectively correspond to the plurality of phase groups, where the target value is used to represent a system capacity;

the processing module 601 is further configured to determine, based on the target value, the first phase group in the plurality of phase groups; and the communications module 602 is configured to send the first phase group to an access network device, where the first phase group is used by the access network device to adjust the phase of the transmission channel by using the first phase group in a current period.

Optionally, a manner in which the processing module 601 obtains the target value corresponding to each of the plurality of phase groups through calculation based on the first DCH user quantities, the first power, and the first AMR traffic volumes that respectively correspond to the plurality of phase groups specifically includes:

for any phase group in the plurality of phase groups, obtaining R_Capacity(k) corresponding to the phase group based on a first DCH user quantity and first power that correspond to the phase group, where $$R\_Capacity(k) = \frac{Capacity(k)}{Capacity(Baseline)},$$

k corresponds to a $k^{th}$ phase group in the plurality of phase groups, Capacity(k) is a capacity value corresponding to the $k^{th}$ phase group, Capacity(k) is equal to a first DCH user quantity corresponding to the $k^{th}$ phase group divided by first power corresponding to the $k^{th}$ phase group, and Capacity(Baseline) is an average value of capacity values corresponding to all of the plurality of phase groups;

obtaining R_AMR(k) based on a first AMR traffic volume corresponding to the phase group, where if a difference between AMR(k) and AMR(Baseline) is less than −AMRScov, R_AMR(k) is 0, and if the difference between AMR(k) and AMR(Baseline) is greater than or equal to −AMRScov, R_AMR(k) is 1; AMR(k) is a first AMR traffic volume corresponding to the $k^{th}$ phase group, and AMR(Baseline) is an average value of the first AMR traffic volumes corresponding to all of the plurality of phase groups; and AMR-Scov is an AMR tolerance threshold of a common coverage area level; and using a product of R_Capacity(k) and R_AMR(k) as the target value.

Optionally, the processing module 601 is further configured to calculate, after obtaining R_AMR(k) based on the first AMR traffic volume corresponding to the phase group, AMR_Total_Baseline, where AMR_Total_Baseline is a sum of AMR(Baseline) of all common coverage areas covered by the information processing device corresponding to the first common coverage area; and the processing module 601 is further configured to, if AMR_Total_Baseline is not equal to 0 and satisfies $$\frac{AMR\_Total\_Mean}{AMR\_Total\_Baseline} \langle 1 - AMR\_Total\_Thld,$$

update R_AMR(k) that corresponds to some common coverage areas covered by the information processing device corresponding to the first common coverage area and corresponds to a first phase group determined in a second period to zero, where the second period is two subtracted from the current period, AMR_Total_Mean is an average value of AMR traffic volumes corresponding to all common coverage areas in a total area covered by the information processing device, and AMR_Total_Thld is an AMR tolerance threshold of a total area level of the information processing device corresponding to the first common coverage area.

Optionally, a manner in which the processing module 601 determines, based on the target value, the first phase group in the plurality of phase groups specifically includes:

obtaining, based on a currently used phase group, a preset quantity of second phase groups in the plurality of phase groups, where a difference between a first phase value in the second phase group and a first phase value in the first phase group determined in a previous period is not greater than a preset degree, and a difference between a second phase value in the second phase group and a second phase value in the first phase group determined in the previous period is not greater than the preset degree:

obtaining, in the preset quantity of second phase groups, a second phase group with a greatest target value;

calculating a first selection probability of the second phase group with the greatest target value, where A=1−ε, A is the first selection probability, $$\varepsilon = \max\left(\min\left(\frac{1}{\sqrt{(0.1*t)}}, \frac{N-1}{N}\right), 0.1\right),$$

t is a valid iteration period number, the valid iteration period number is a number of a period in which the phases of the transmission channels are adjusted by using a phase group, and N is equal to the preset quantity;

calculating a second selection probability of a phase group in the preset quantity of second phase groups except the second phase group with the greatest target value, where $$B = \frac{\varepsilon}{N-1},$$

and B is the second selection probability; and randomly selecting, based on the first selection probability and the second selection probability, a phase group in the preset quantity of second phase groups as the first phase group.

Optionally, the processing module 601 is further configured to, before obtaining the first DCH user quantities, the first power, and the first AMR traffic volumes that respectively correspond to the plurality of phase groups, collect first data, a difference between second data and third data, and fourth data that are in the current period:

the processing module 601 is further configured to filter the first data that is in the current period, and obtain and store a first DCH user quantity corresponding to the first phase group determined in the previous period, where $$\text{filter\_Q1} = \left(1 - \frac{1}{n}\right) * \text{filter\_Q1} + \frac{1}{n} * Q1,$$

filter_Q1 is the first DCH user quantity corresponding to the first phase group determined in the previous period, Q1 is the first data collected in the current period, and n is a dynamic filtering coefficient of the first phase group determined in the previous period;

the processing module 601 is further configured to filter the difference between the second data and the third data that are in the current period, and obtain and store first power corresponding to the first phase group determined in the previous period, where $$\text{filter\_Q2} = \left(1 - \frac{1}{n}\right) * \text{filter\_Q2} + \frac{1}{n} * Q2,$$

filter_Q2 is the first power corresponding to the first phase group determined in the previous period, Q2 is the difference between the second data and the third data collected in the current period, and n is the dynamic filtering coefficient of the first phase group determined in the previous period; and the processing module 601 is further configured to filter the fourth data that is in the current period, and obtain and store a first AMR traffic volume corresponding to the first phase group determined in the previous period, where $$\text{filter\_Q3} = \left(1 - \frac{1}{n}\right) * \text{filter\_Q3} + \frac{1}{n} * Q3,$$

filter_Q3 is the first AMR traffic volume corresponding to the first phase group determined in the previous period, Q3 is the fourth data collected in the current period, and n is the dynamic filtering coefficient of the first phase group determined in the previous period.

Optionally, a manner in which the processing module 601 filters the first data that is in the current period specifically includes:

if the first data in the current period is greater than zero, filtering the first data that is in the current period;

a manner in which the processing module 601 filters the difference between the second data and the third data that are in the current period specifically includes:

if the difference between the second data and the third data in the current period is greater than zero, filtering the difference between the second data and the third data that are in the current period; and a manner in which the processing module 601 filters the fourth data that is in the current period specifically includes:

if the fourth data in the current period is greater than zero, filtering the fourth data that is in the current period.

Optionally, a manner in which the processing module 601 filters the first data that is in the current period specifically includes:

if |M1−Mean1|≤(4*StdevScov1) is satisfied, filtering the first data that is in the current period, where M1 is the first data in the current period, Mean1 is an average value of a sum of DCH user quantities that are collected at a preset quantity of traffic statistics time points and are of all the cells in the first common coverage area, and StdevScov1 is a standard deviation of the sum of the DCH user quantities of all the cells in the first common coverage area:

a manner in which the processing module 601 filters the difference between the second data and the third data that are in the current period specifically includes:

if |M2−Mean2|≤(4*StdevScov2) is satisfied, filtering the difference between the second data and the third data that are in the current period, where M2 is the difference between the second data and the third data in the current period, Mean1 is an average value of differences that are collected at the preset quantity of traffic statistics time points and are between first non-high-speed downlink packet access power and first common channel power of all the cells in the first common coverage area, and StdevScov2 is a standard deviation of the differences between the first non-high-speed downlink packet access power and the first common channel power of all the cells in the first common coverage area and a manner in which the processing module 601 filters the fourth data that is in the current period specifically includes:

if |M3−Mean3|≤(4*StdevScov3) is satisfied, filtering the fourth data that is in the current period, where M1 is the fourth data in the current period. Mean3 is an average value of a sum of AMR traffic volumes that are collected at the preset quantity of traffic statistics time points and are of all the cells in the first common coverage area, and StdevScov3 is a standard deviation of the sum of the AMR traffic volumes of all the cells in the first common coverage area.

Optionally, the first phase group is used by the access network device to adjust a phase of a transmission channel of a first cell in the first common coverage area by using the first phase group in a current period;

the processing module 601 is further configured to obtain a third phase group used to adjust a phase of a transmission channel of a second cell in the first common coverage area, where the third phase group is obtained based on the first phase group, the first cell and the second cell are different, the first phase group and the second phase group are different, if there are a plurality of second cells, third phase groups respectively corresponding to the second cells are different, and the first cell and the second cell are central cells of clusters in the first common coverage area; and the communications module 602 is configured to send the third phase group to the access network device.

Figure 7:
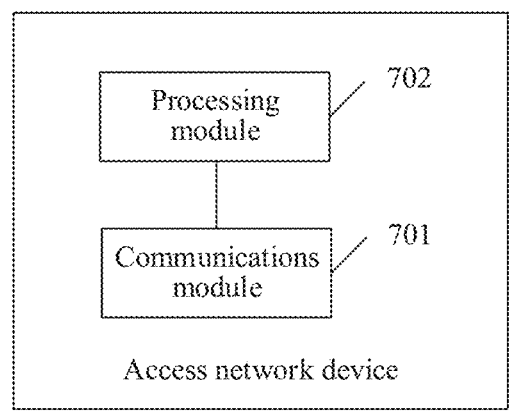
FIG. 7 is a schematic structural diagram of an access network device according to an embodiment of this application.

FIG. 7 shows an access network device according to an embodiment of the present invention. The access network device includes a communications module 701 and a processing module 702.

The communications module 701 is configured to receive a first phase group sent by an information processing device, where the first phase group includes a first phase value and a second phase value;

the processing module 702 is configured to adjust a phase of a first transmission channel based on the first phase value; and the processing module 702 is further configured to adjust a phase of a second transmission channel based on the second phase value, where the first transmission channel and the second transmission channel belong to different polarization groups.

Optionally, a manner in which the processing module 702 adjusts the phase of the first transmission channel based on the first phase value specifically includes:

adjusting, at a preset adjustment speed, the phase of the first transmission channel based on the first phase value; and a manner in which the processing module 702 adjusts the phase of the second transmission channel based on the second phase value specifically includes:

adjusting, at the preset adjustment speed, the phase of the first transmission channel based on the second phase value.

Optionally, a difference between the first phase value in the first phase group and a first phase value in a first phase group determined in a previous period is not greater than a preset degree, and a difference between the second phase value in the first phase group and a second phase value in the first phase group determined in the previous period is not greater than the preset degree.

Optionally, the first phase group is used by the access network device to adjust a phase of a transmission channel of a first cell in the first common coverage area by using the first phase group in a current period:

the communications module 701 is further configured to receive a third phase group sent by the information processing device and used to adjust a phase of a transmission channel of a second cell in the first common coverage area, where the third phase group is obtained based on the first phase group, the first cell and the second cell are different, the first phase group and the second phase group are different, if there are a plurality of second cells, third phase groups respectively corresponding to the second cells are different, and the first cell and the second cell are central cells of clusters in the first common coverage area;

the processing module 702 is further configured to adjust a phase of a first transmission channel of the second cell based on a first phase value in the third phase group; and the processing module 702 is further configured to adjust a phase of a second transmission channel of the second cell based on a second phase value in the third phase group, where the first transmission channel of the second cell and the second transmission channel of the second cell belong to different polarization groups.

Optionally, the processing module 702 is further configured to, if the access network device does not receive the first phase group within a preset time period, obtain a default phase group;

the processing module 702 is further configured to adjust the phase of the first transmission channel based on a first phase value in the default phase group; and the processing module 702 is further configured to adjust the phase of the second transmission channel based on a second phase value in the default phase group.

Figure 8:
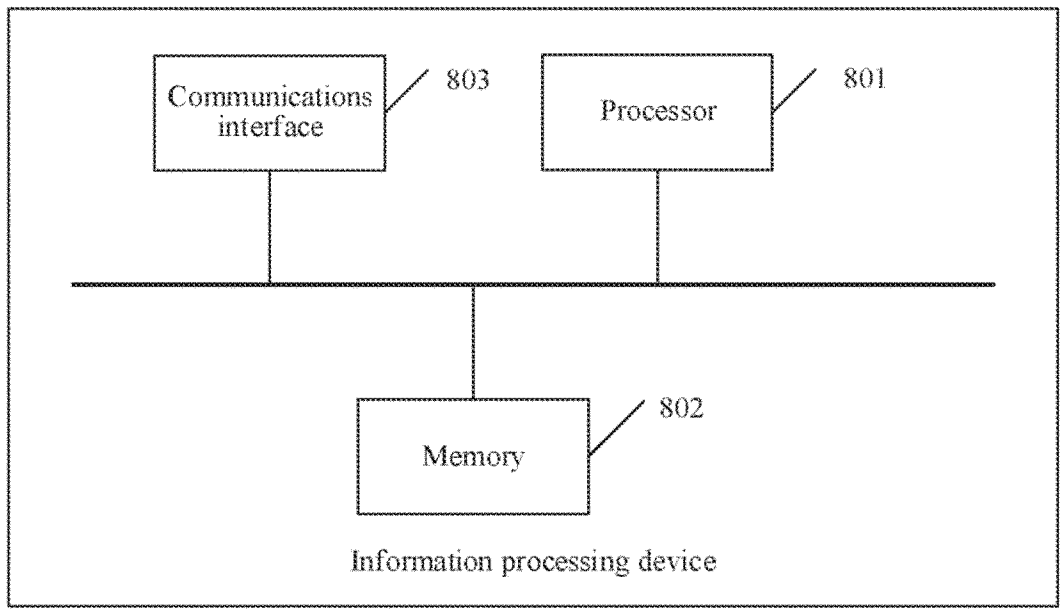
FIG. 8 is a schematic structural diagram of another information processing device according to an embodiment of this application.

FIG. 8 is a schematic structural diagram of an information processing device disclosed in an embodiment of this application. As shown in FIG. 8, the information processing device 800 includes a processor 801, a memory 802, and a communications interface 803. The processor 801, the memory 802, and the communications interface 803 are connected to each other.

The processor 801 may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. Alternatively, the processor 801 may be a combination of processors implementing a computing function, for example, a combination of one or more microprocessors, or a combination of the DSP and a microprocessor.

The communications interface 803 is configured to implement communication with another network element (such as an access network device).

The processor 801 invokes program code stored in the memory 802, may perform steps performed by the information processing device described in FIG. 5 in the foregoing method embodiments, or may perform other steps performed by the information processing device in the method embodiments.

Figure 9:
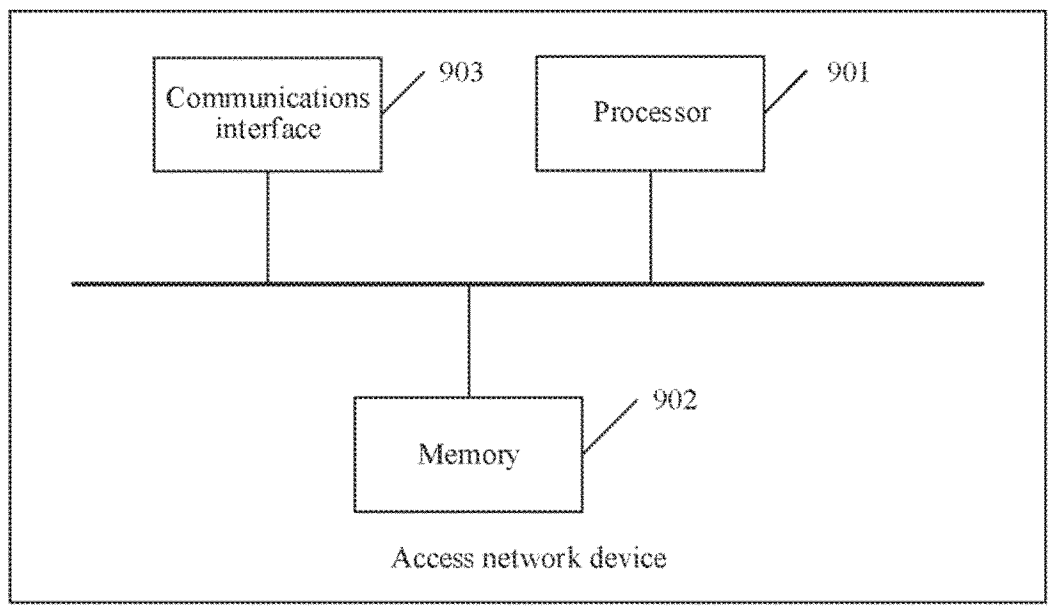
FIG. 9 is a schematic structural diagram of another access network device according to an embodiment of this application.

FIG. 9 is a schematic structural diagram of an access network device disclosed in an embodiment of this application. As shown in FIG. 9, the access network device 900 includes a processor 901, a memory 902, and a communications interface 903. The processor 901, the memory 902, and the communications interface 903 are connected to each other.

The processor 901 may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. Alternatively, the processor 901 may be a combination of processors implementing a computing function, for example, a combination of one or more microprocessors, or a combination of the DSP and a microprocessor.

The communications interface 903 is configured to implement communication with another network element (such as an information processing device).

The processor 901 invokes program code stored in the memory 902, may perform steps performed by the access network device described in FIG. 5 in the foregoing method embodiments, or may perform other steps performed by the access network device in the method embodiments.

It can be understood that, when the embodiments of this application are applied to a chip of an information processing device, the chip of the information processing device implements the functions of the information processing device in the foregoing method embodiments. The chip of the information processing device sends first information to another module (such as a radio frequency module or an antenna) in the information processing device, and receives second information from the another module in the information processing device. The first information is sent to the access network device through the another module in the information processing device, and the second information is sent to the information processing device by the access network device. When the embodiments of this application are applied to a chip of the access network device, the chip of the access network device implements the functions of the access network device in the foregoing method embodiments. The chip of the access network device receives first information from another module (such as a radio frequency module or an antenna) in the access network device, and sends second information to the another module in the access network device. The first information is sent to the access network device by the information processing device, and the second information is sent to the information processing device. The first information and the second information herein do not specifically refer to a type of information, but are just used to represent a communication manner between the chip and the another module.

All or some of the foregoing embodiments may be implemented by means of software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, a digital versatile disc (DVD)), a semiconductor medium (for example, a solid state disk (SSD)), or the like.

Based on the same inventive concept, a principle of resolving a problem by each device provided in the embodiments of this application is similar to that in the method embodiments of this application. Therefore, for implementation of each device, refer to implementation of the method. For brevity of descriptions, details are not described herein again.

In the foregoing embodiments, the description of each embodiment has respective focuses. For a part that is not described in detail in an embodiment, refer to related descriptions in other embodiments.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

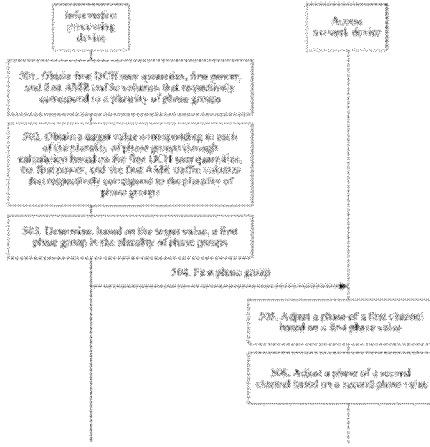

What is claimed is:

1. An information processing method, applied to an information processing device, wherein the method comprises:
obtaining first dedicated channel (DCH) user quantities, first power, and first adaptive multi-rate (AMR) traffic volumes that respectively correspond to a plurality of phase groups, wherein:
the phase group comprises a first phase value and a second phase value,
the first phase value and the second phase value are used to adjust phases of different transmission channels,
a first DCH user quantity corresponding to a target phase group is a user quantity obtained based on first data that is in a first period,
the target phase group is any one of the plurality of phase groups,
the first period is a period next to a period in which the target phase group is determined as a first phase group,
the first data in the first period is a sum of DCH user quantities that are collected in the first period and are of cells in a first common coverage area,
the first power is power obtained based on a difference between second data and third data that are in the first period,
the second data in the first period is a sum of non-high-speed downlink packet access power that is collected in the first period and is of the cells in the first common coverage area,
the third data in the first period is a sum of common channel power that is collected in the first period and is of the cells in the first common coverage area,
the first AMR traffic volume is a traffic volume obtained based on fourth data that is in the first period, and
the fourth data in the first period is a sum of AMR traffic volumes that are collected in the first period and are of the cells in the first common coverage area;
obtaining a target value corresponding to each of the plurality of phase groups through calculation based on the first DCH user quantities, the first power, and the first AMR traffic volumes that respectively correspond to the plurality of phase groups, wherein the target value is used to represent a system capacity;
determining, based on the target value, the first phase group in the plurality of phase groups; and
sending the first phase group to an access network device, wherein the first phase group is used by the access network device to adjust the phase of the transmission channel by using the first phase group in a current period.

2. The method according to claim 1, wherein, the obtaining of the target value comprises:
for any phase group in the plurality of phase groups, obtaining R_Capacity(k) corresponding to the phase group based on a first DCH user quantity and first power that correspond to the phase group, wherein $$\text{R\_Capacity}(k) = \frac{\text{Capacity }(k)}{\text{Capacity (Baseline)}},$$

R_Capacity(k) is a first component for determining the target value, k corresponds to a $k^{th}$ phase group in the plurality of phase groups, Capacity(k) is a capacity value corresponding to the $k^{th}$ phase group, Capacity(k) is equal to a first DCH user quantity corresponding to the $k^{th}$ phase group divided by first power corresponding to the $k^{th}$ phase group, and Capacity(Baseline) is an average value of capacity values corresponding to all of the plurality of phase groups;

obtaining R_AMR(k) based on a first AMR traffic volume corresponding to the phase group, wherein R_AMR(k) is a second component for determining the target value, if a difference between AMR(k) and AMR(Baseline) is less than −AMRScov, R_AMR(k) is 0, and if the difference between AMR(k) and AMR(Baseline) is greater than or equal to −AMRScov, R_AMR(k) is 1; AMR(k) is a first AMR traffic volume corresponding to the $k^{th}$ phase group, and AMR(Baseline) is an average value of the first AMR traffic volumes corresponding to all of the plurality of phase groups; and AMRScov is an AMR tolerance threshold of a common coverage area level; and using a product of R_Capacity(k) and R_AMR(k) as the target value.

3. The method according to claim 2, wherein after the obtaining of R_AMR(k) based on a first AMR traffic volume corresponding to the phase group, the method further comprises:

calculating AMR_Total_Baseline, wherein AMR_Total_Baseline is a sum of AMR(Baseline) of all common coverage areas covered by the information processing device corresponding to the first common coverage area; and based on a determination that AMR_Total_Baseline is not equal to 0 and satisfies $$\frac{AMR\_Total\_Mean}{AMR\_Total\_Baseline}\langle 1 - AMR\_Total\_Thld,$$

updating R_AMR(k) that corresponds to some common coverage areas covered by the information processing device corresponding to the first common coverage area and corresponds to a first phase group determined in a second period to zero, wherein the second period is two subtracted from the current period, AMR_Total_Mean is an average value of AMR traffic volumes corresponding to all common coverage areas in a total area covered by the information processing device, and AMR_Total_Thld is an AMR tolerance threshold of a total area level of the information processing device corresponding to the first common coverage area.

4. The method according to claim 1, wherein the determining of the first phase group in the plurality of phase groups comprises:

obtaining, based on a currently used phase group, a preset quantity of second phase groups in the plurality of phase groups, wherein a difference between a first phase value in the second phase group and a first phase value in the first phase group determined in a previous period is less than or equal to a preset degree, and a difference between a second phase value in the second phase group and a second phase value in the first phase group determined in the previous period is less than or equal to the preset degree;

obtaining, in the preset quantity of second phase groups, a second phase group with a greatest target value;

calculating a first selection probability of the second phase group with the greatest target value, wherein A=1−ε, A is the first selection probability, $$\varepsilon = \max\left(\min\left(\frac{1}{\sqrt{(0.1*t)}}, \frac{N-1}{N}\right), 0.1\right),$$

where t is a valid iteration period number, the valid iteration period number is a number of a period in which the phases of the transmission channels are adjusted by using a phase group, and N is equal to the preset quantity;

calculating a second selection probability of a phase group in the preset quantity of second phase groups except the second phase group with the greatest target value, wherein $$B = \frac{\varepsilon}{N-1},$$

and B is the second selection probability; and randomly selecting, based on the first selection probability and the second selection probability, a phase group in the preset quantity of second phase groups as the first phase group.

5. The method according to claim 1, wherein before the obtaining first DCH user quantities, the first power, and the first AMR traffic volumes, the method further comprises:

collecting first data, a difference between second data and third data, and fourth data that are in the current period;

filtering the first data that is in the current period, and obtaining and storing a first DCH user quantity corresponding to the first phase group determined in the previous period, wherein $$\text{filter\_Q1} = \left(1 - \frac{1}{n}\right) * \text{filter\_Q1} + \frac{1}{n} * Q1,$$

where filter_Q1 is the first DCH user quantity corresponding to the first phase group determined in the previous period, Q1 is the first data collected in the current period, and n is a dynamic filtering coefficient of the first phase group determined in the previous period;

filtering the difference between the second data and the third data that are in the current period, and obtaining and storing first power corresponding to the first phase group determined in the previous period, wherein $$\text{filter\_Q2} = \left(1 - \frac{1}{n}\right) * \text{filter\_Q2} + \frac{1}{n} * Q2,$$

where filter_Q2 is the first power corresponding to the first phase group determined in the previous period, Q2 is the difference between the second data and the third data collected in the current period, and n is the dynamic filtering coefficient of the first phase group determined in the previous period; and filtering the fourth data that is in the current period, and obtaining and storing a first AMR traffic volume corresponding to the first phase group determined in the previous period, wherein $$\text{filter\_Q3} = \left(1 - \frac{1}{n}\right) * \text{filter\_Q3} + \frac{1}{n} * Q3,$$

where filter_Q3 is the first AMR traffic volume corresponding to the first phase group determined in the previous period, Q3 is the fourth data collected in the current period, and n is the dynamic filtering coefficient of the first phase group determined in the previous period.

6. The method according to claim 5, wherein the filtering of the first data that is in the current period comprises:
based on a determination that the first data in the current period is greater than zero, filtering the first data that is in the current period,
wherein
the filtering the difference between the second data and the third data that are in the current period comprises:
based on a determination that the difference between the second data and the third data in the current period is greater than zero, filtering the difference between the second data and the third data that are in the current period, and
the filtering the fourth data that is in the current period comprises:
based on a determination that the fourth data in the current period is greater than zero, filtering the fourth data that is in the current period.

7. The method according to claim 5, wherein the filtering of the first data that is in the current period comprises:
based on a determination that |M1−Mean1|≤(4*StdevScov1) is satisfied, filtering the first data that is in the current period, wherein M1 is the first data in the current period, Mean1 is an average value of a sum of DCH user quantities that are collected at a preset quantity of traffic statistics time points and are of all the cells in the first common coverage area, and StdevScov1 is a standard deviation of the sum of the DCH user quantities of all the cells in the first common coverage area,
wherein
the filtering the difference between the second data and the third data that are in the current period comprises:
based on a determination that |M2−Mean2|≤(4*StdevScov2) is satisfied, filtering the difference between the second data and the third data that are in the current period, wherein M2 is the difference between the second data and the third data in the current period, Mean1 is an average value of differences that are collected at the preset quantity of traffic statistics time points and are between first non-high-speed downlink packet access power and first common channel power of all the cells in the first common coverage area, and StdevScov2 is a standard deviation of the differences between the first non-high-speed downlink packet access power and the first common channel power of all the cells in the first common coverage area, and
the filtering the fourth data that is in the current period comprises:
based on a determination that |M3−Mean3|≤(4*StdevScov3) is satisfied, filtering the fourth data that is in the current period, wherein M1 is the fourth data in the current period, Mean3 is an average value of a sum of AMR traffic volumes that are collected at the preset quantity of traffic statistics time points and are of all the cells in the first common coverage area, and StdevScov3 is a standard deviation of the sum of the AMR traffic volumes of all the cells in the first common coverage area.

8. The method according to claim 4, wherein the first phase group is used by the access network device to adjust a phase of a transmission channel of a first cell in the first common coverage area by using the first phase group in the current period, and the method further comprises:
obtaining a third phase group of the plurality of phase groups used to adjust a phase of a transmission channel of a second cell of a plurality of second cells in the first common coverage area, wherein
the third phase group of the plurality of phase groups is obtained based on the first phase group,
the first cell and the second cell of the plurality of second cells are different,
the first phase group and the second phase group are different,
the third phase groups of the plurality of phase groups respectively correspond to the second cells of the plurality of second cells,
the third phase groups of the plurality of phase groups corresponding to the second cells of the plurality of second cells are different, and
the first cell and the second cell of the plurality of second cells are central cells of clusters in the first common coverage area; and
sending the third phase group of the plurality of third phase groups to the access network device.

9. An information processing device, comprising:
a processor; and
a memory coupled to the processor, the memory comprising instructions that, when executed by the processor, cause the information processing device to:
obtain first dedicated channel (DCH) user quantities, first power, and first adaptive multi-rate (AMR) traffic volumes that respectively correspond to a plurality of phase groups, wherein:
the phase group comprises a first phase value and a second phase value,
the first phase value and the second phase value are used to adjust phases of different transmission channels,
a first DCH user quantity corresponding to a target phase group is a user quantity obtained based on first data that is in a first period,
the target phase group is any one of the plurality of phase groups,
the first period is a period next to a period in which the target phase group is determined as a first phase group,
the first data in the first period is a sum of DCH user quantities that are collected in the first period and are of cells in a first common coverage area,
the first power is power obtained based on a difference between second data and third data that are in the first period, the second data in the first period is a sum of non-high-speed downlink packet access power that is collected in the first period and is of the cells in the first common coverage area, the third data in the first period is a sum of common channel power that is collected in the first period and is of the cells in the first common coverage area, the first AMR traffic volume is a traffic volume obtained based on fourth data that is in the first period, and the fourth data in the first period is a sum of AMR traffic volumes that are collected in the first period and are of the cells in the first common coverage area;

obtain a target value corresponding to each of the plurality of phase groups through calculation based on the first DCH user quantities, the first power, and the first AMR traffic volumes that respectively correspond to the plurality of phase groups, wherein the target value is used to represent a system capacity;

determine, based on the target value, the first phase group in the plurality of phase groups; and send the first phase group to an access network device, wherein the first phase group is used by the access network device to adjust the phase of the transmission channel by using the first phase group in a current period.

10. The information processing device according to claim 9, wherein the information processing device is further configured to:

for any phase group in the plurality of phase groups, obtain R_Capacity(k) corresponding to the phase group based on a first DCH user quantity and first power that correspond to the phase group, wherein $$R\_Capacity(k) = \frac{Capacity\ (k)}{Capacity\ (Baseline)},$$

R_Capacity(k) is a first component for determining the target value k corresponds to a $k^{th}$ phase group in the plurality of phase groups, Capacity(k) is a capacity value corresponding to the $k^{th}$ phase group, Capacity(k) is equal to a first DCH user quantity corresponding to the $k^{th}$ phase group divided by first power corresponding to the $k^{th}$ phase group, and Capacity(Baseline) is an average value of capacity values corresponding to all of the plurality of phase groups;

obtain R_AMR(k) based on a first AMR traffic volume corresponding to the phase group, wherein R_AMR(k) is a second component for determining the target value if a difference between AMR(k) and AMR(Baseline) is less than −AMRScov, R_AMR(k) is 0, and if the difference between AMR(k) and AMR(Baseline) is greater than or equal to −AMRScov, R_AMR(k) is 1; AMR(k) is a first AMR traffic volume corresponding to the $k^{th}$ phase group, and AMR(Baseline) is an average value of the first AMR traffic volumes corresponding to all of the plurality of phase groups; and AMRScov is an AMR tolerance threshold of a common coverage area level; and using a product of R_Capacity(k) and R_AMR(k) as the target value.

11. The information processing device according to claim 10, wherein the information processing device is further configured to:

calculate AMR_Total_Baseline, wherein AMR_Total_Baseline is a sum of AMR(Baseline) of all common coverage areas covered by the information processing device corresponding to the first common coverage area; and based on a determination that AMR_Total_Baseline is not equal to 0 and satisfies $$\frac{AMR\_Total\_Mean}{AMR\_Total\_Baseline} \langle 1 - AMR\_Total\_Thld,$$

update R_AMR(k) that corresponds to some common coverage areas covered by the information processing device corresponding to the first common coverage area and corresponds to a first phase group determined in a second period to zero, wherein the second period is two subtracted from the current period, AMR_Total_Mean is an average value of AMR traffic volumes corresponding to all common coverage areas in a total area covered by the information processing device, and AMR_Total_Thld is an AMR tolerance threshold of a total area level of the information processing device corresponding to the first common coverage area.

12. The information processing device according to claim 9, wherein the information processing device is further configured to:

obtain, based on a currently used phase group, a preset quantity of second phase groups in the plurality of phase groups, wherein a difference between a first phase value in the second phase group and a first phase value in the first phase group determined in a previous period is less than or equal to a preset degree, and a difference between a second phase value in the second phase group and a second phase value in the first phase group determined in the previous period is less than or equal to the preset degree;

obtain, in the preset quantity of second phase groups, a second phase group with a greatest target value;

calculate a first selection probability of the second phase group with the greatest target value, wherein A=1−ε, A is the first selection probability, $$\varepsilon = \max\left(\min\left(\frac{1}{\sqrt{(0.1*t)}}, \frac{N-1}{N}\right), 0.1\right),$$

where t is a valid iteration period number, the valid iteration period number is a number of a period in which the phases of the transmission channels are adjusted by using a phase group, and N is equal to the preset quantity;

calculate a second selection probability of a phase group in the preset quantity of second phase groups except the second phase group with the greatest target value, wherein $$B = \frac{\varepsilon}{N-1},$$

and B is the second selection probability; and randomly select, based on the first selection probability and the second selection probability, a phase group in the preset quantity of second phase groups as the first phase group.

13. The information processing device according to claim 9, wherein the information processing device is further configured to:
  collect first data, a difference between second data and third data, and fourth data that are in the current period;
  filter the first data that is in the current period, and obtaining and storing a first DCH user quantity corresponding to the first phase group determined in the previous period, wherein $$\text{filter\_Q1} = \left(1 - \frac{1}{n}\right) * \text{filter\_Q1} + \frac{1}{n} * Q1,$$

where filter_Q1 is the first DCH user quantity corresponding to the first phase group determined in the previous period, Q1 is the first data collected in the current period, and n is a dynamic filtering coefficient of the first phase group determined in the previous period;
  filter the difference between the second data and the third data that are in the current period, and obtaining and storing first power corresponding to the first phase group determined in the previous period, wherein $$\text{filter\_Q2} = \left(1 - \frac{1}{n}\right) * \text{filter\_Q2} + \frac{1}{n} * Q2,$$

where filter_Q2 is the first power corresponding to the first phase group determined in the previous period, Q2 is the difference between the second data and the third data collected in the current period, and n is the dynamic filtering coefficient of the first phase group determined in the previous period; and
  filter the fourth data that is in the current period, and obtaining and storing a first AMR traffic volume corresponding to the first phase group determined in the previous period, wherein $$\text{filter\_Q3} = \left(1 - \frac{1}{n}\right) * \text{filter\_Q3} + \frac{1}{n} * Q3,$$

where filter_Q3 is the first AMR traffic volume corresponding to the first phase group determined in the previous period, Q3 is the fourth data collected in the current period, and n is the dynamic filtering coefficient of the first phase group determined in the previous period.

14. The information processing device according to claim 13, wherein the information processing device is further configured to:
  based on a determination that the first data in the current period is greater than zero, filter the first data that is in the current period;
  based on a determination that the difference between the second data and the third data in the current period is greater than zero, filter the difference between the second data and the third data that are in the current period; and
  based on a determination that the fourth data in the current period is greater than zero, filter the fourth data that is in the current period.

15. The information processing device according to claim 13, wherein the information processing device is further configured to:
  based on a determination that |M1−Mean1|≤(4*StdevScov1) is satisfied, filter the first data that is in the current period, wherein M1 is the first data in the current period, Mean1 is an average value of a sum of DCH user quantities that are collected at a preset quantity of traffic statistics time points and are of all the cells in the first common coverage area, and StdevScov1 is a standard deviation of the sum of the DCH user quantities of all the cells in the first common coverage area;
  based on a determination that |M2−Mean2|≤(4*StdevScov2) is satisfied, filter the difference between the second data and the third data that are in the current period, wherein M2 is the difference between the second data and the third data in the current period, Mean1 is an average value of differences that are collected at the preset quantity of traffic statistics time points and are between first non-high-speed downlink packet access power and first common channel power of all the cells in the first common coverage area, and StdevScov2 is a standard deviation of the differences between the first non-high-speed downlink packet access power and the first common channel power of all the cells in the first common coverage area; and
  based on a determination that |M3−Mean3|≤(4*StdevScov3) is satisfied, filter the fourth data that is in the current period, wherein M1 is the fourth data in the current period, Mean3 is an average value of a sum of AMR traffic volumes that are collected at the preset quantity of traffic statistics time points and are of all the cells in the first common coverage area, and StdevScov3 is a standard deviation of the sum of the AMR traffic volumes of all the cells in the first common coverage area.

16. The information processing device according to claim 12, wherein the information processing device is further configured to:
  obtain a third phase group of the plurality of phase groups used to adjust a phase of a transmission channel of a second cell of a plurality of second cells in the first common coverage area, wherein
    the third phase group of the plurality of phase groups is obtained based on the first phase group,
    the first cell and the second cell of the plurality of second cells are different,
    the first phase group and the second phase group are different,
    the third phase groups of the plurality of phase groups respectively correspond to the second cells of the plurality of second cells,
    the third phase groups of the plurality of phase groups corresponding to the second cells of the plurality of second cells are different, and
    the first cell and the second cell of the plurality of second cells are central cells of clusters in the first common coverage area; and
  send the third phase group of the plurality of third phase groups to the access network device.

* * * * *

UNITED STATES PATENT AND TRADEMARK OFFICE
CERTIFICATE OF CORRECTION

PATENT NO. : 11,363,486 B2
APPLICATION NO. : 16/833171
DATED : June 14, 2022
INVENTOR(S) : Zhong Huang It is certified that error appears in the above-identified patent and that said Letters Patent is hereby corrected as shown below:

On the Title Page

The title page should be replaced with the attached title page.

In the Drawings

The original Figs. 8 and 9 should be added to the Drawings section as shown in the attached replacement sheet.

Signed and Sealed this
Seventeenth Day of October, 2023

Katherine Kelly Vidal
*Director of the United States Patent and Trademark Office*

(12) United States Patent
Huang et al.

(10) Patent No.: US 11,363,486 B2
(45) Date of Patent: Jun. 14, 2022

(54) INFORMATION PROCESSING METHOD AND DEVICE FOR IMPROVING SYSTEM CAPACITY

(71) Applicant: HUAWEI TECHNOLOGIES CO., LTD., Shenzhen (CN)

(72) Inventors: Zhong Huang, Chengdu (CN); Peng Lu, Chengdu (CN); Qiang Zhou, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 15 days.

(21) Appl. No.: 16/833,171

(22) Filed: Mar. 27, 2020

(65) Prior Publication Data
US 2020/0267590 A1 Aug. 20, 2020

Related U.S. Application Data

(63) Continuation of application No. PCT/CN2018/107618, filed on Sep. 26, 2018.

(30) Foreign Application Priority Data

Sep. 29, 2017 (CN) .......................... 201710908317.9

(51) Int. Cl.
  *H04W 28/02* (2009.01)
  *H04W 28/22* (2009.01)

(52) U.S. Cl.
  CPC ............ *H04W 28/0257* (2013.01); *H04W 28/0263* (2013.01); *H04W 28/22* (2013.01)

(58) Field of Classification Search
  CPC ......... H04W 28/0257; H04W 28/0263; H04W 28/22
  See application file for complete search history.

(56) References Cited

U.S. PATENT DOCUMENTS

2006/0293074 A1* 12/2006 Bottomley ............ H04W 52/322
  455/522
2013/0176973 A1*  7/2013 Gormley ............... H04L 1/205
  370/329
(Continued)

FOREIGN PATENT DOCUMENTS

| CN | 102421108 A | 4/2012 |
| CN | 102972082 A | 3/2013 |

(Continued)

OTHER PUBLICATIONS

ITU-R Ad Hoc,"Draft update of Section 5.1", RT-040017, total 37 pages.

(Continued)

*Primary Examiner* — Chi H Pham
*Assistant Examiner* — Weibin Huang
(74) *Attorney, Agent, or Firm* — Hauptman Ham, LLP

(57) ABSTRACT

Embodiments of this application provide an information processing method. The method includes: obtaining first dedicated channel DCH user quantities, first power, and first adaptive multi-rate AMR traffic volumes that respectively correspond to a plurality of phase groups; obtaining a target value corresponding to each of the plurality of phase groups through calculation based on the first DCH user quantities, the first power, and the first AMR traffic volumes that respectively correspond to the plurality of phase groups, where the target value is used to represent a system capacity; determining, based on the target value, the first phase group in the plurality of phase groups; and sending the first phase group to an access network device, where the first phase group is used by the access network device to adjust a phase of a transmission channel by using the first phase group in a current period.

16 Claims, 7 Drawing Sheets